United States Patent
Tarandek et al.

(10) Patent No.: US 12,280,760 B2
(45) Date of Patent: Apr. 22, 2025

(54) ELECTRONIC BRAKE SYSTEM AND CONTROL METHOD THEREFOR

(71) Applicant: HL MANDO CORPORATION, Gyeonggi-do (KR)

(72) Inventors: Kristijan Tarandek, Neu-Isenburg (DE); Hans Joerg Feigel, Rosbach (DE); Josko Kurbasa, Waldsolms (DE); Rachid Bouzid, Frankfurt am Main (DE); Ralf Leiter, Mendig (DE); Hyo Jin Jeong, Gyeonggi-do (KR); Hee Chul Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 723 days.

(21) Appl. No.: 17/599,880

(22) PCT Filed: Mar. 27, 2020

(86) PCT No.: PCT/KR2020/004277
§ 371 (c)(1),
(2) Date: Sep. 29, 2021

(87) PCT Pub. No.: WO2020/204510
PCT Pub. Date: Oct. 8, 2020

(65) Prior Publication Data
US 2022/0194339 A1 Jun. 23, 2022

(30) Foreign Application Priority Data

Mar. 29, 2019 (DE) .......................... 102019204524.3
Mar. 26, 2020 (KR) ....................... 10-2020-0036902
(Continued)

(51) Int. Cl.
B60T 8/94 (2006.01)
B60T 7/04 (2006.01)
(Continued)

(52) U.S. Cl.
CPC ................. *B60T 8/94* (2013.01); *B60T 8/326* (2013.01); *B60T 8/885* (2013.01); *B60T 13/745* (2013.01);
(Continued)

(58) Field of Classification Search
CPC .......... B60T 8/94; B60T 8/326; B60T 13/745; B60T 8/885; B60T 7/042;
(Continued)

(56) References Cited

U.S. PATENT DOCUMENTS 6,317,675 B1 11/2001 Stölzl et al.
7,837,278 B2 11/2010 Nilsson
(Continued)

FOREIGN PATENT DOCUMENTS

DE 10 2009 016 638 10/2009
DE 10 2012 212 090 1/2014
(Continued)

OTHER PUBLICATIONS

WO document No. WO 2018188901 to Michels et al published on Oct. 18, 2018.*
(Continued)

*Primary Examiner* — Pamela Rodriguez
(74) *Attorney, Agent, or Firm* — WOMBLE BOND DICKINSON (US) LLP

(57) ABSTRACT

A electric brake system includes a main device that provides a first hydraulic pressure to a plurality of wheel cylinders respectively installed on a plurality of wheels, based on a position of a brake pedal; and art auxiliary device that provides a second hydraulic pressure to first and second wheel cylinders respectively installed on first and second wheels among the plurality of wheels based on the position of the brake pedal in a state in which the main device does not generate the first hydraulic pressure. The auxiliary (Continued)

device receives power from a power network different from that of the main device, and the auxiliary device controls at least one of first and second parking brakes respectively installed on third and fourth wheels among the plurality of wheels. In such an electric brake system, when the main device fails or is out of control, the auxiliary device may auxiliary generate the hydraulic pressure required for braking and may generate braking force using the parking brake.

15 Claims, 15 Drawing Sheets

(30) Foreign Application Priority Data

Mar. 26, 2020 (KR) .................. 10-2020-0036911
Mar. 26, 2020 (KR) .................. 10-2020-0036929

(51) Int. Cl.
  *B60T 8/32* (2006.01)
  *B60T 8/88* (2006.01)
  *B60T 13/74* (2006.01)

(52) U.S. Cl.
  CPC ........... *B60T 7/042* (2013.01); *B60T 2220/04* (2013.01); *B60T 2270/402* (2013.01); *B60T 2270/403* (2013.01); *B60T 2270/404* (2013.01); *B60T 2270/82* (2013.01)

(58) Field of Classification Search
  CPC ......... B60T 2270/402; B60T 2270/404; B60T 2270/403; B60T 2270/82; B60T 2220/04
  See application file for complete search history.

(56) References Cited

U.S. PATENT DOCUMENTS

| | | | |
|---|---|---|---|
| 7,866,761 | B2 | 1/2011 | Gerum et al. |
| 9,873,414 | B2 | 1/2018 | Förster et al. |
| 10,081,345 | B2 | 9/2018 | Masuda |
| 2011/0073419 | A1 | 3/2011 | Matsuzaki et al. |
| 2016/0009263 | A1 | 1/2016 | Feigel et al. |
| 2016/0214582 | A1 | 7/2016 | Brenn et al. |
| 2017/0072920 | A1 | 3/2017 | Besier et al. |
| 2018/0072292 | A1 | 3/2018 | Renaud |
| 2018/0334148 | A1* | 11/2018 | Feigel .................. B60T 13/662 |
| 2018/0334149 | A1* | 11/2018 | Feigel .................. B60T 13/148 |
| 2018/0339690 | A1 | 11/2018 | Kim et al. |
| 2019/0031165 | A1 | 1/2019 | Besier et al. |
| 2021/0394728 | A1* | 12/2021 | Yoo ...................... B60T 8/4081 |

FOREIGN PATENT DOCUMENTS

| | | |
|---|---|---|
| DE | 10 2015 208 148 | 12/2015 |
| DE | 10 2016 015 544 | 6/2018 |
| DE | 10 2017 114 556 | 1/2019 |
| EP | 1 758 778 | 3/2007 |
| EP | 3 339 119 | 6/2018 |
| JP | 2014-166843 | 9/2014 |
| KR | 10-2018-0126258 | 11/2018 |
| WO | 2005/110829 | 11/2005 |
| WO | 2018/145869 | 8/2018 |
| WO | 2018/192986 | 10/2018 |

OTHER PUBLICATIONS

International Search Report for PCT/KR2020/004277 mailed on Jul. 20, 2020 (now published as WO 2020/204510) with English translation provided by Google Translate.
Written Opinion of the International Searching Authority for PCT/KR2020/004277 mailed on Jul. 20, 2020 (now published as WO 2020/204510) with English translation provided by Google Translate.
Extended European Search Report for European Patent Application No. 20784339.2 dated on May 23, 2023.
International Preliminary Report on Patentability (Chapter I) for PCT/KR2020/004277 issued on Sep. 28, 2021 (now published as WO 2020/204510) with English translation from WIPO.
Office Action dated Sep. 8, 2023 for Chinese Patent Application No. 202080025584.1 and it English translation from Global Dossier.

* cited by examiner

[FIG. 1]
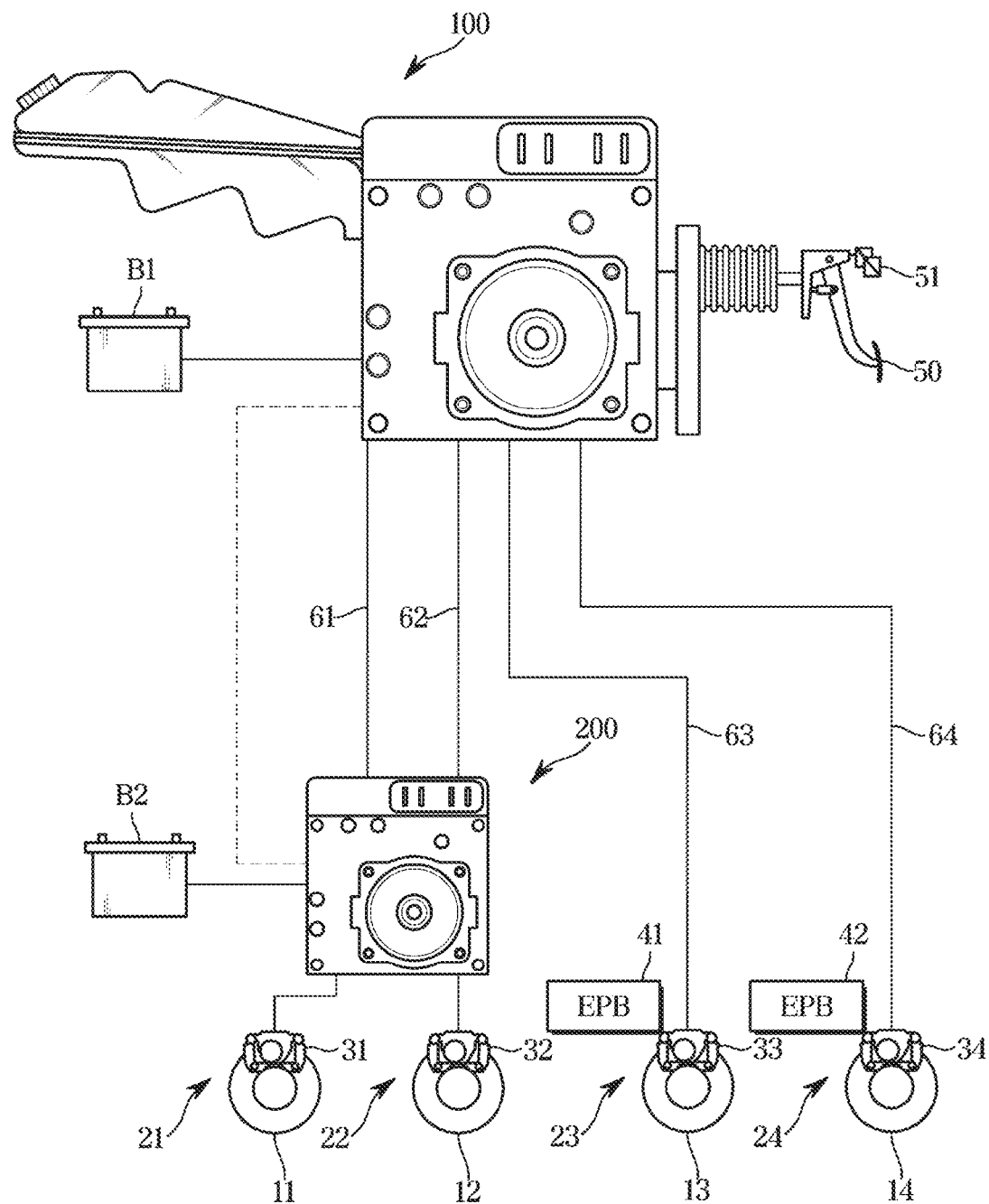

[FIG. 2]
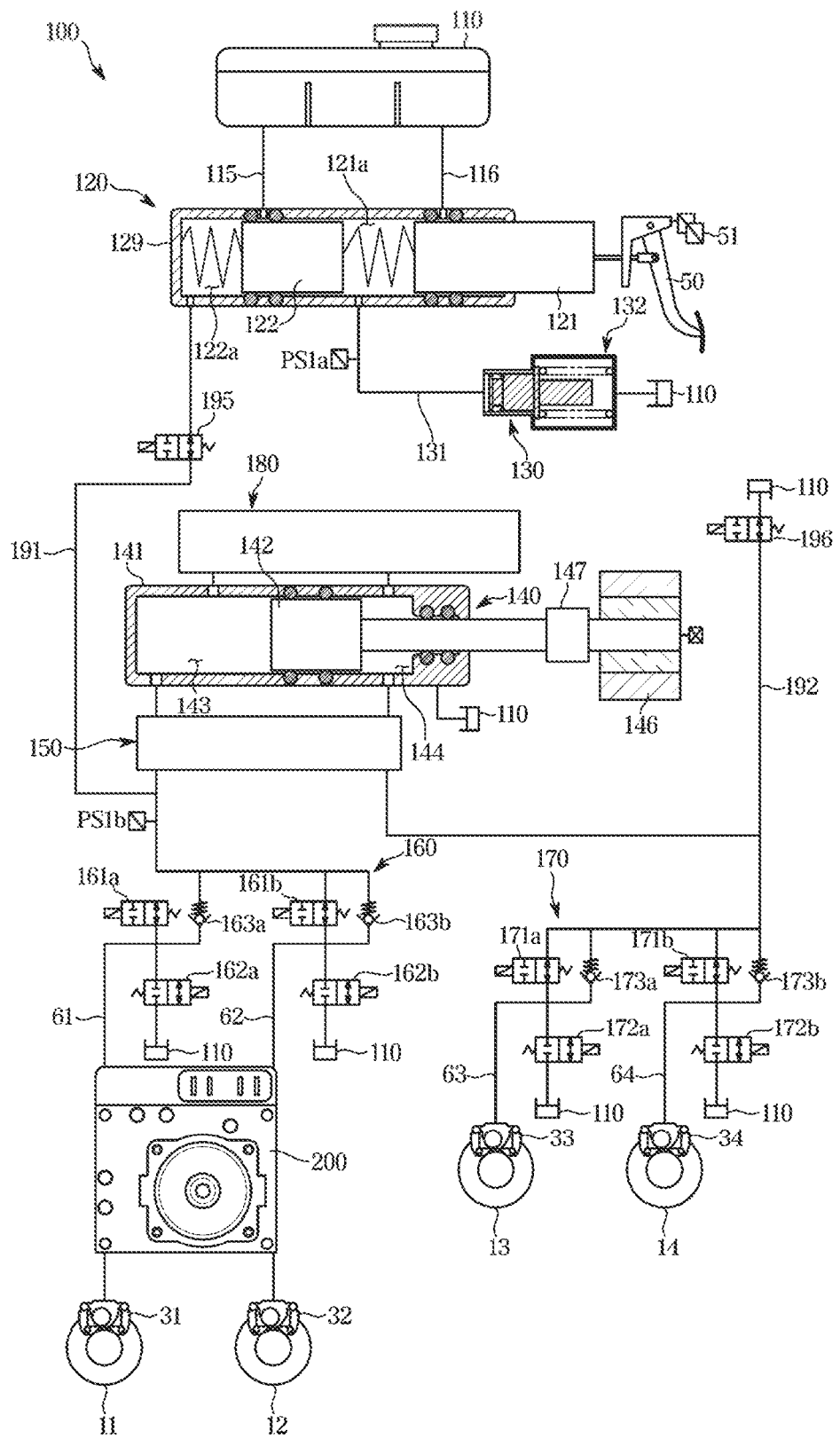

[FIG. 3]
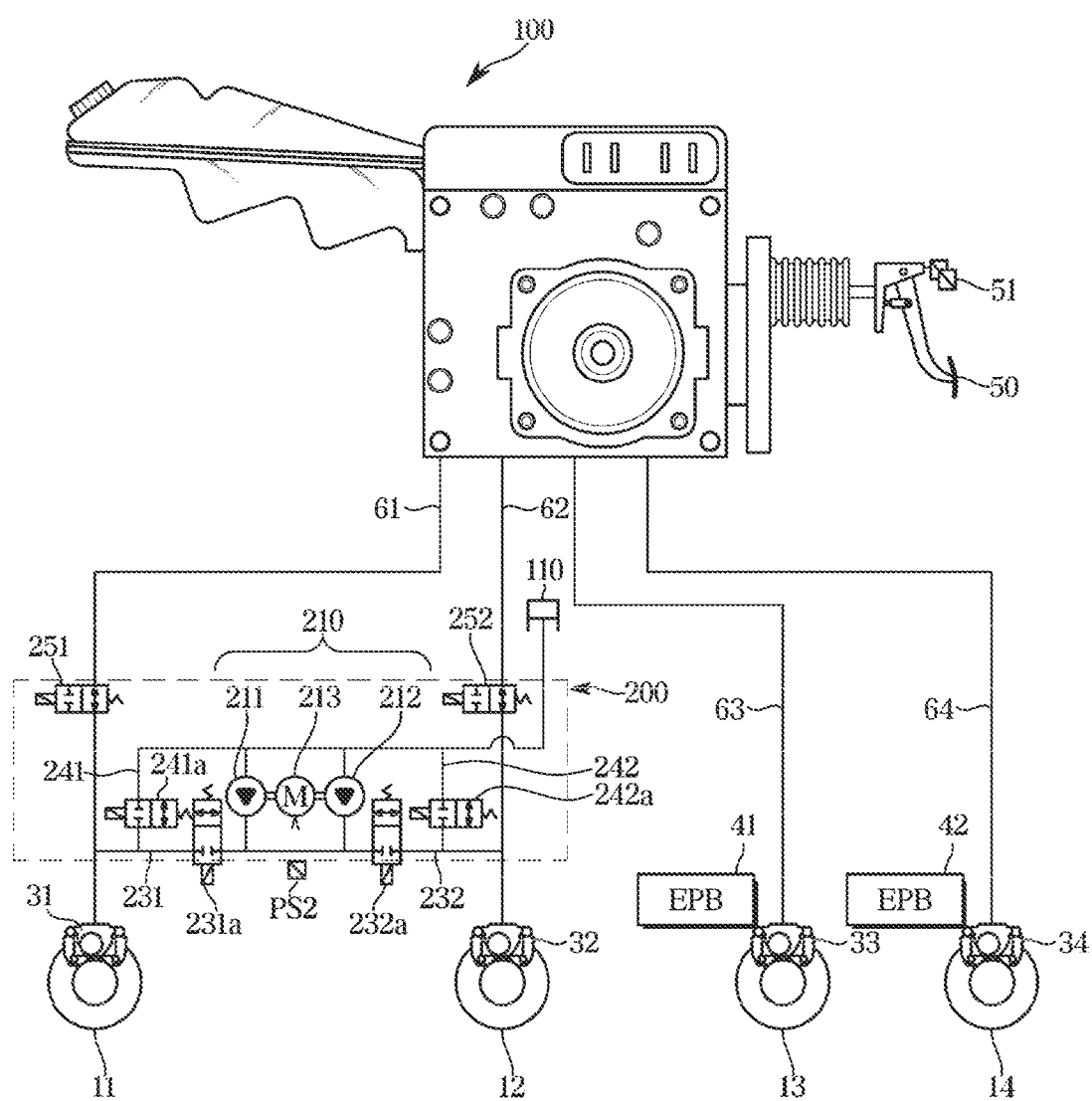

[FIG. 4]
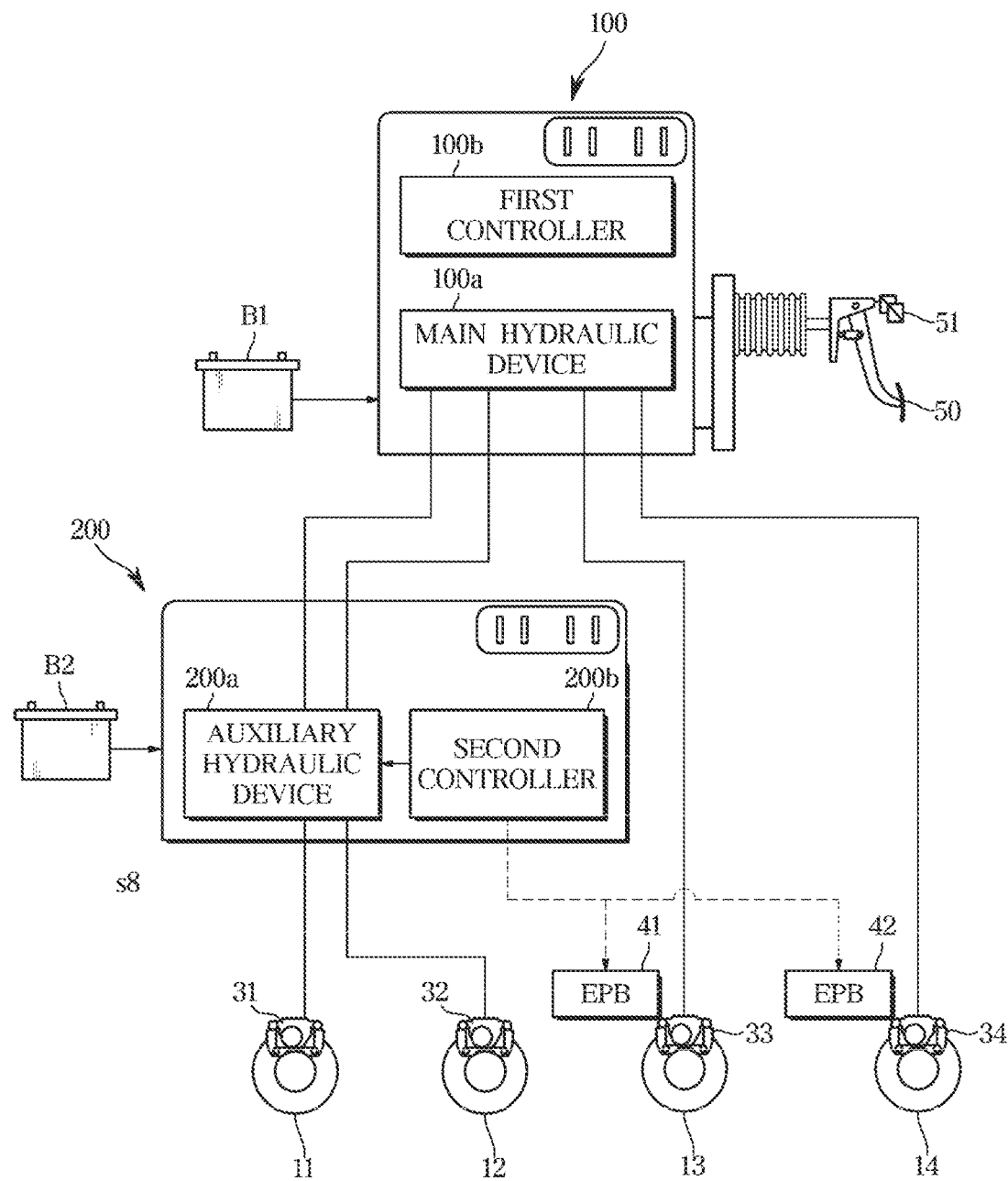

[FIG. 5]
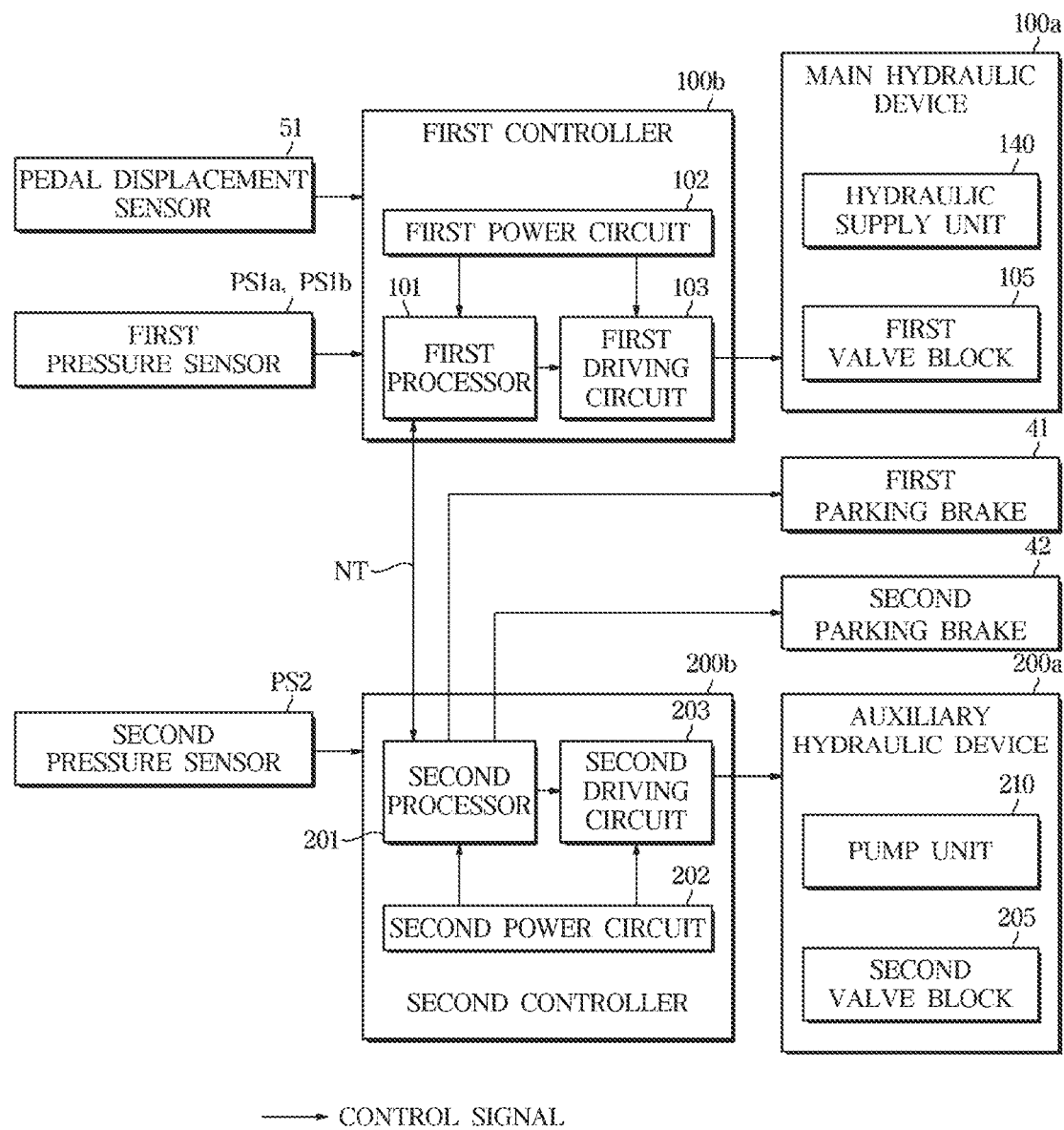
→ CONTROL SIGNAL

[FIG. 6]
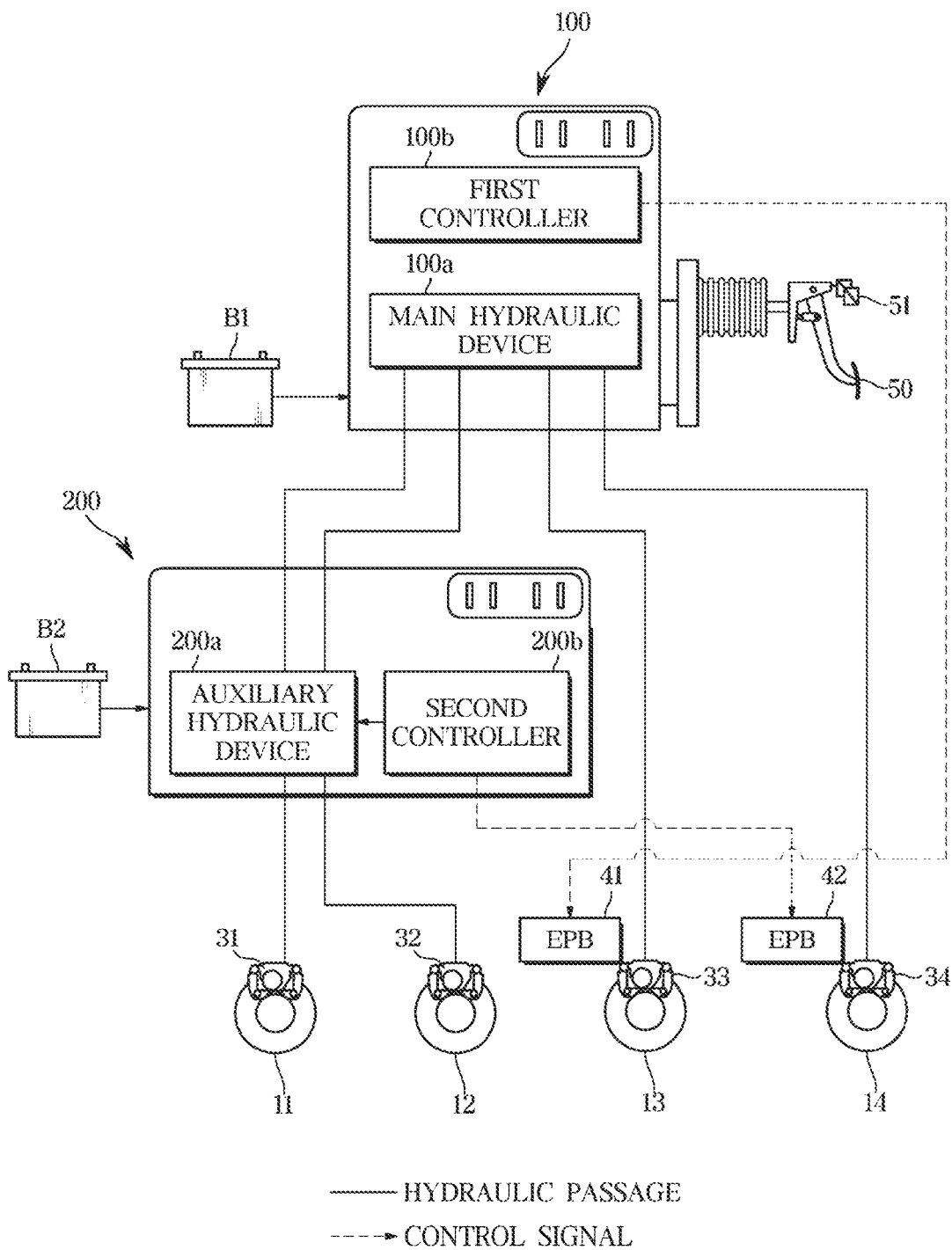

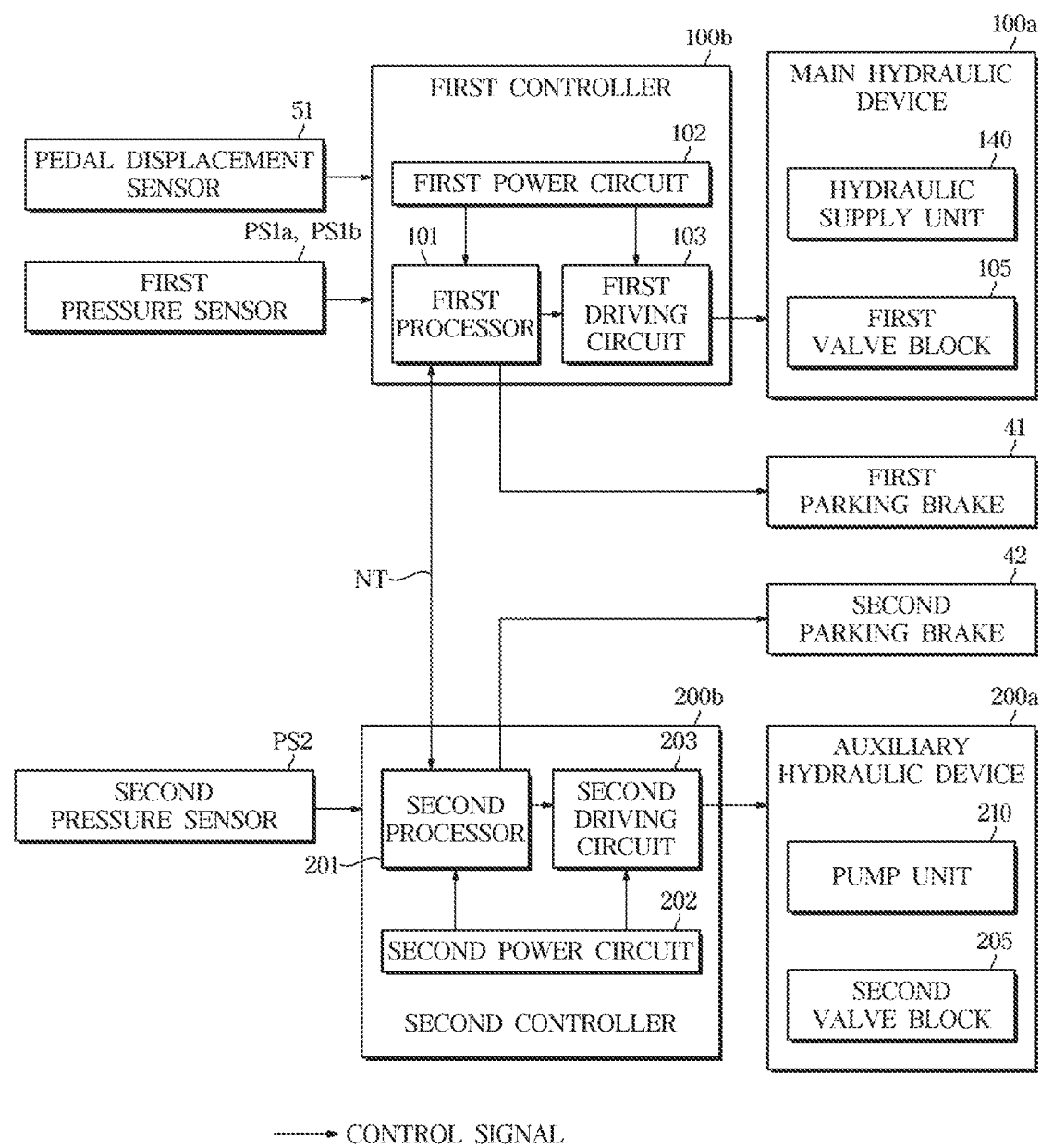
[FIG. 7]

[FIG. 8]
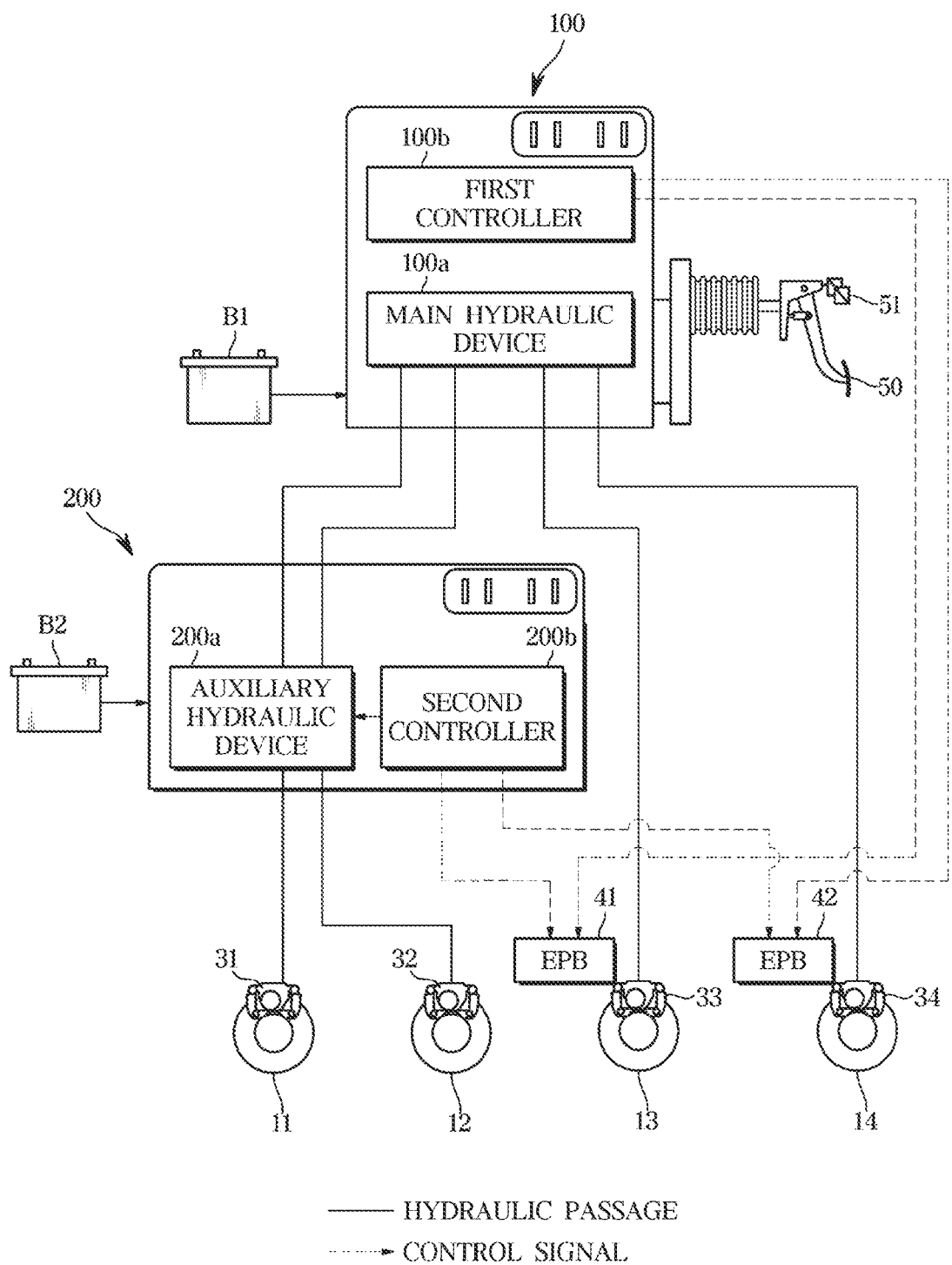

[FIG. 9]
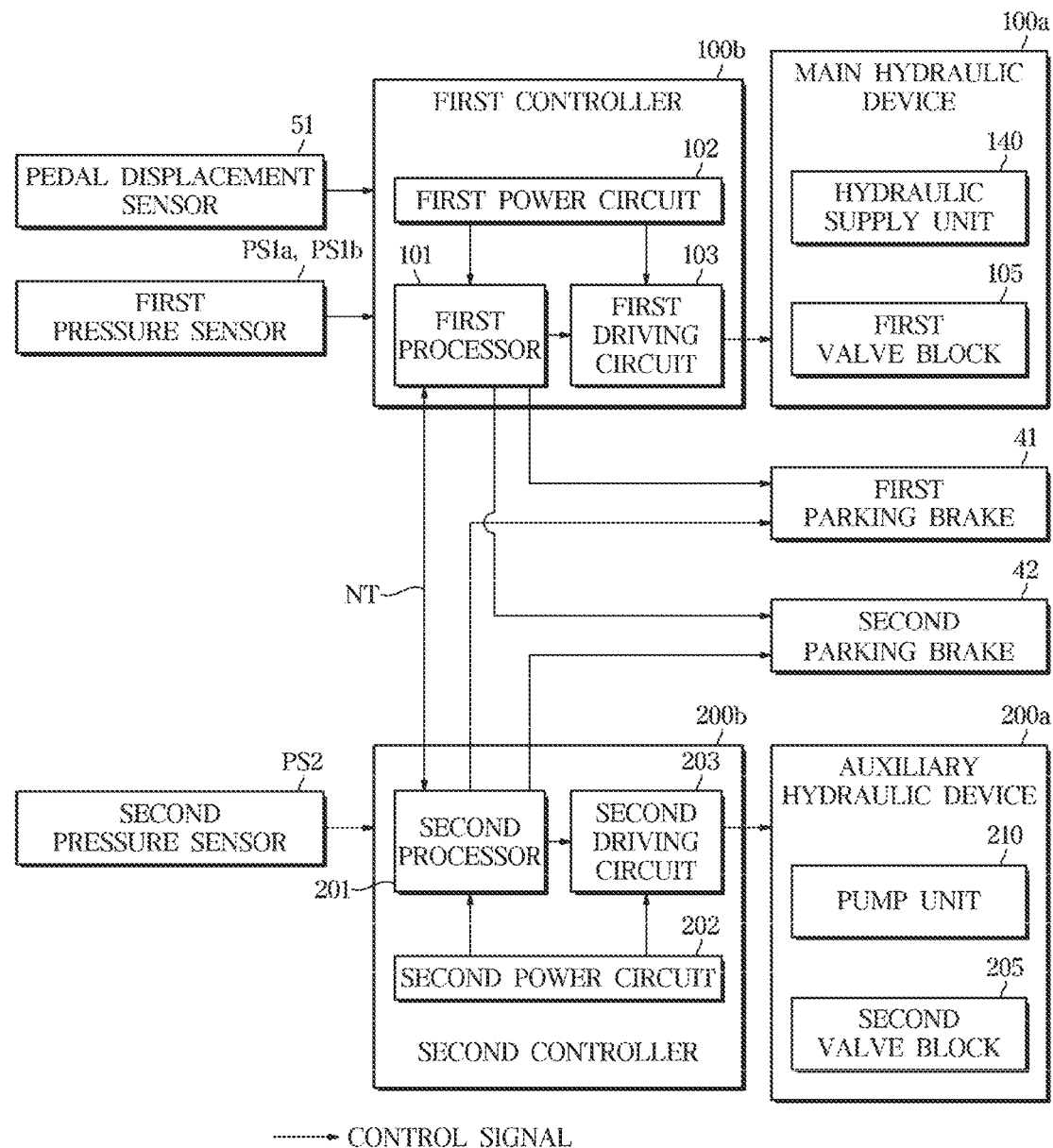

[FIG. 10]
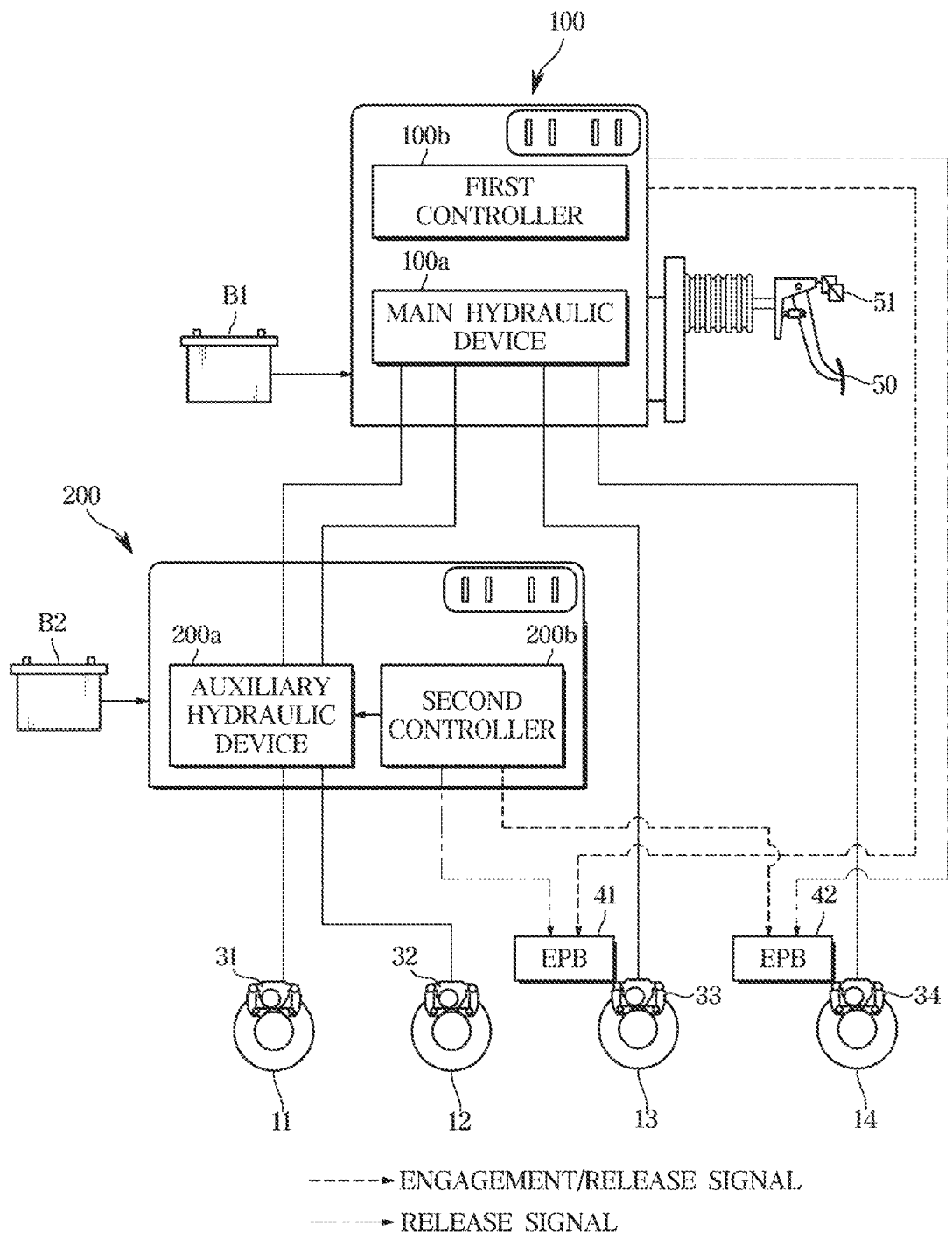

[FIG. 11]
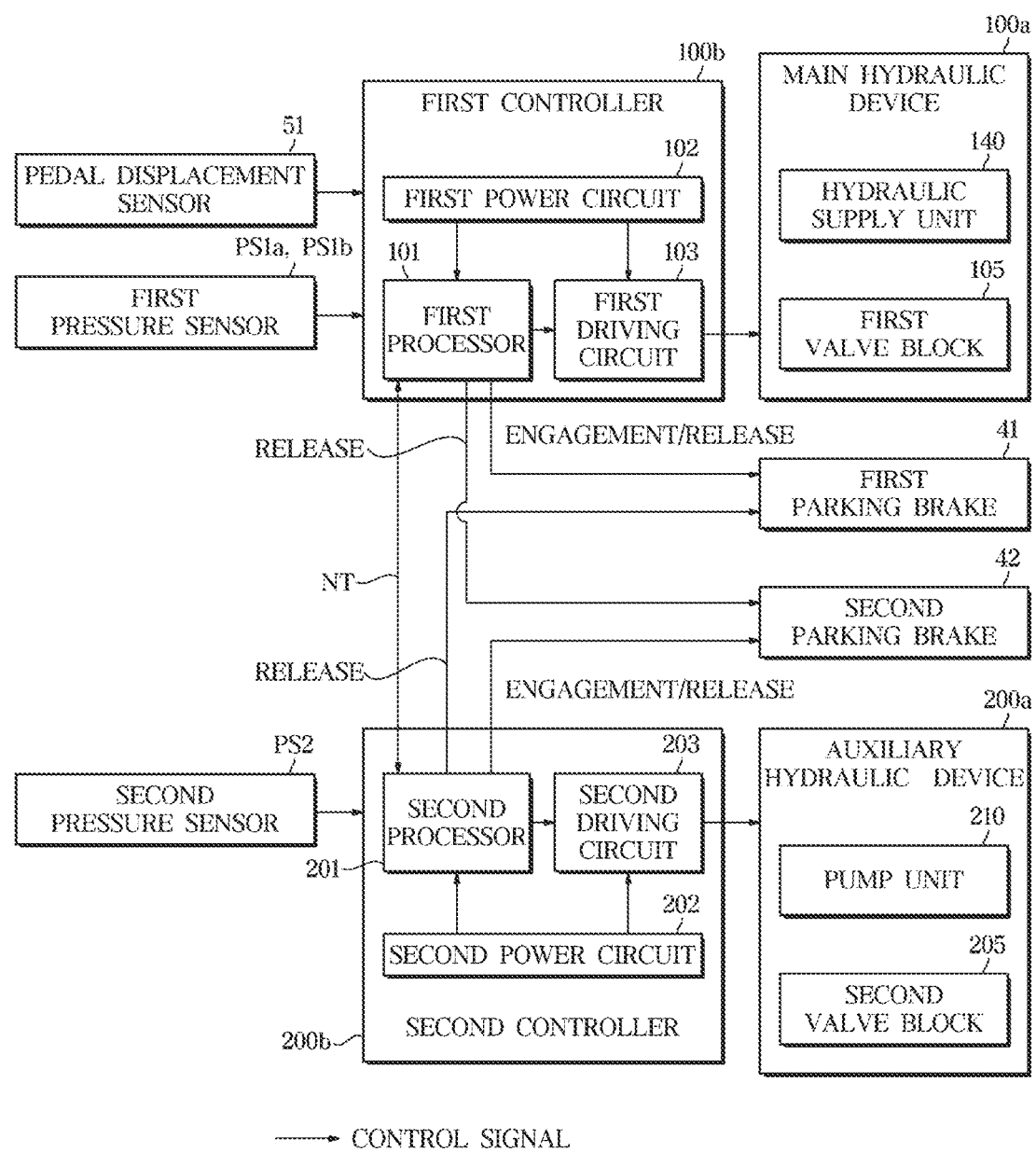

[FIG. 12]
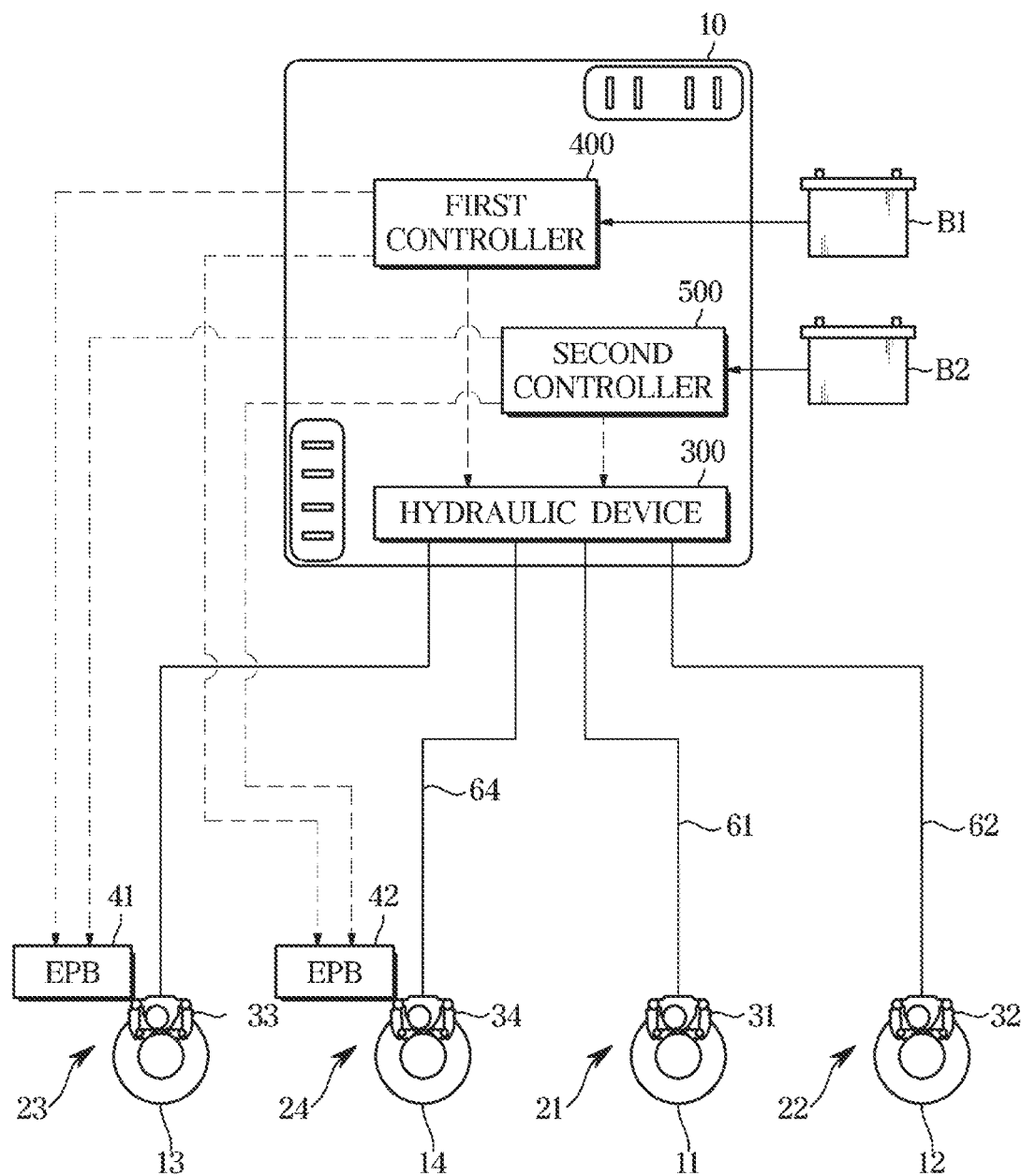

[FIG. 13]
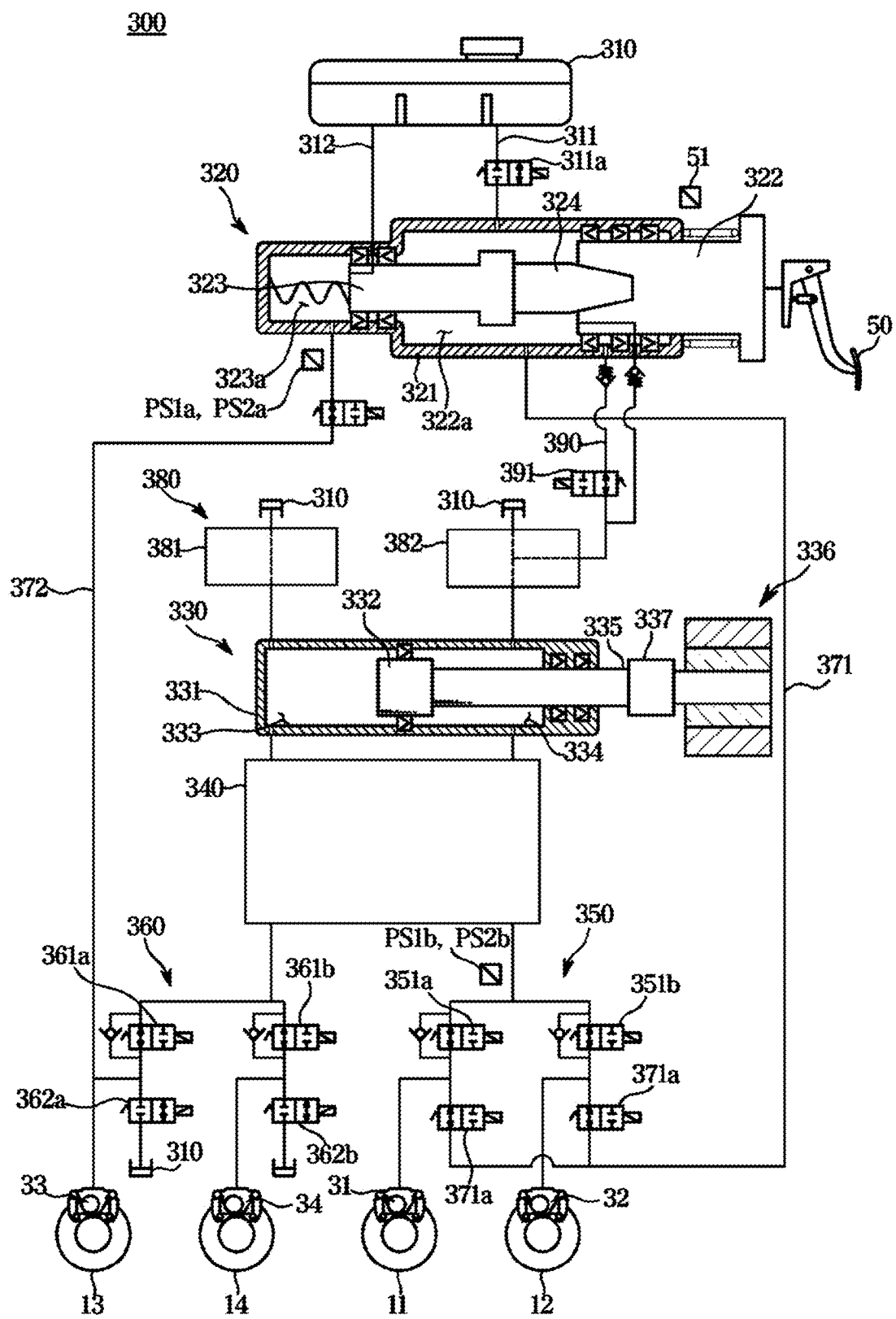

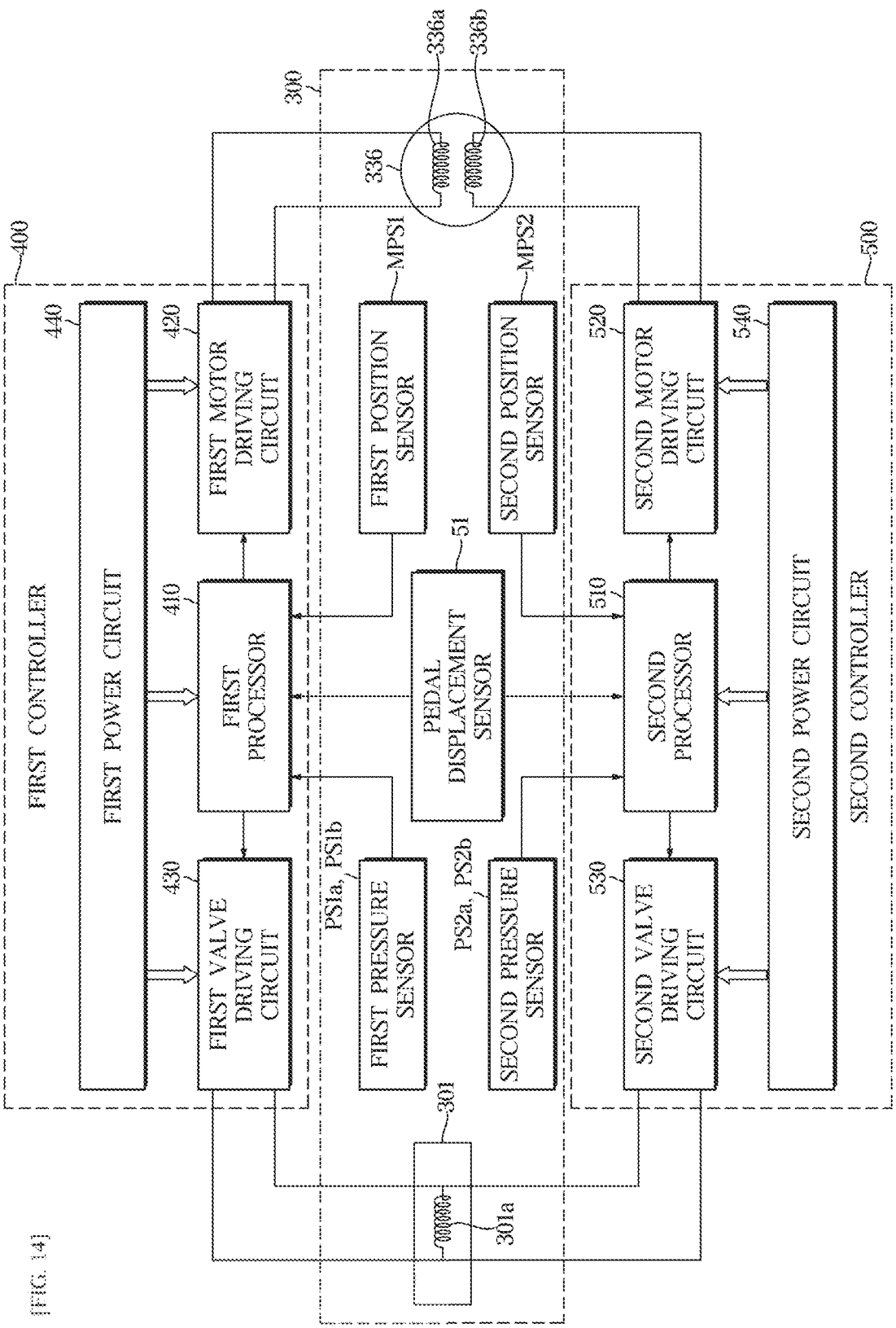

[FIG. 15]
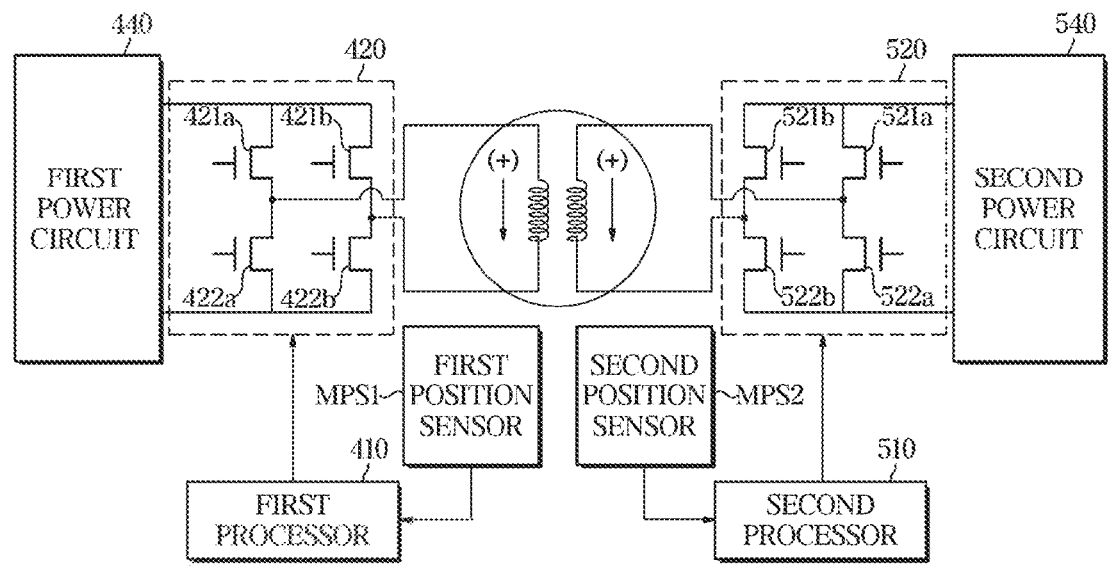
[FIG. 16]
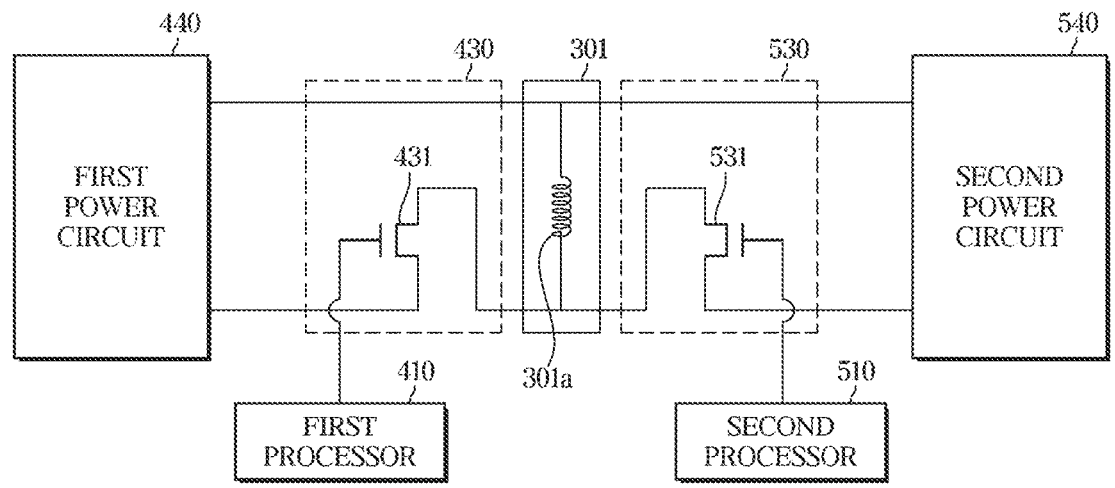

ELECTRONIC BRAKE SYSTEM AND CONTROL METHOD THEREFOR

CROSS-REFERENCE TO RELATED APPLICATIONS

This application is the national stage of International Application No. PCT/KR2020/004277, filed on Mar. 27, 2020, which claims priority, under 35 U.S.C. 119(a), to German Patent Application No. 102019204524.3 filed in Germany on Mar. 29, 2019, and Korean Patent Application No. 10-2020-0036902 filed in Korea on Mar. 26, 2020, and Korean Patent Application No. 10-2020-0036911 filed in Korea on Mar. 26, 2020, and Korean Patent Application No. 10-2020-0036929 filed in Korea on Mar. 26, 2020, the disclosures of which are incorporated by reference herein in their entireties.

TECHNICAL FIELD

The disclosed invention relates to an electric brake system and a control method thereof, and more particularly, to an electric brake system for generating braking force using an electric signal corresponding to a displacement of a brake pedal, and a control method thereof.

BACKGROUND ART

A brake system for performing braking is essentially installed on a vehicle, and various types of brake systems have been proposed for the safety of drivers and passengers.

Conventional brake systems provide the hydraulic pressure (pressure of brake oil) required for braking to wheel cylinders by using a mechanically connected booster when a driver presses a brake pedal. However, as the market demand for implementing various braking functions in detail in response to the operating environment of the vehicle increases, recently an electric brake system including a hydraulic supply unit that receives an electric signal as the driver's intention to brake from the electric brake system when the driver steps on the brake pedal and supplies the hydraulic pressure required for braking to wheel cylinders is widely used.

However, in the ease of an autonomous driving vehicle in which the driver is not directly involved in driving of the vehicle, which is being developed recently, the driver does not operate the brake pedal. Accordingly, when the electric brake system fails or is out of control, there is a need for an auxiliary device capable of auxiliary generating the hydraulic pressure required for braking.

DISCLOSURE

Technical Problem

For the above reasons, an aspect of the disclosed invention is to provide an electric brake system including an auxiliary device capable of auxiliary generating the hydraulic pressure required for braking when a main device fails or is out of control.

An aspect of the disclosed invention is to provide an electric brake system including an auxiliary device capable of generating braking force using a parking brake when a main device fails or is out of control.

Another aspect of the disclosed invention is to provide an electric brake system capable of generating braking force using a parking brake when a device for generating hydraulic pressure fails or out of control.

Technical Solution

The electric brake system according to an aspect of the disclosed invention may include a main device that provides a first hydraulic pressure to a plurality of wheel cylinders respectively installed on a plurality of wheels, based on a position of a brake pedal: and an auxiliary device that provides a second hydraulic pressure to first and second wheel cylinders respectively installed on first and second wheels among the plurality of wheels based on the position of the brake pedal in a state in which the main device docs not generate the first hydraulic pressure. The auxiliary device may receive power from a power network different from that of the main device. The auxiliary device may control at least one of first and second parking brakes respectively installed on third and fourth wheels among the plurality of wheels.

The control method of an electric brake system comprising a main device that generates a first hydraulic pressure and an auxiliary device that generates a second hydraulic pressure by receiving power from a power network different from that of the main device, according to an aspect of the disclosed invention may include providing the first hydraulic pressure to a plurality of wheel cylinders respectively installed on a plurality of wheels by the main device, based on a position of a brake pedal; providing the second hydraulic pressure to first and second wheel cylinders respectively installed on first and second wheels among the plurality of wheels by the auxiliary device, based on the position of the brake pedal in a state in which the main device does not generate the first hydraulic pressure; and controlling at least one of first and second parking brakes respectively installed on third and fourth wheels among the plurality of wheels by the auxiliary device in response to a driver's parking command.

The electric brake system according to an aspect of the disclosed invention may include a hydraulic device including a cylinder block, a hydraulic piston accommodated in the cylinder block, and a motor to move the hydraulic piston; a first controller that controls the motor to provide hydraulic pressure to a plurality of wheel cylinders respectively installed on a plurality of wheels, based on a position of a brake pedal; and a second controller that controls the motor to provide the hydraulic pressure to the plurality of wheel cylinders respectively installed on the plurality of wheels based on the position of the brake pedal in a state in which the first controller does not control the hydraulic device. At least one of the first controller and the second controller may control first and second parking brakes respectively installed on first and second wheels among the plurality of wheels.

Advantageous Effect

According to one aspect of the disclosed invention, it is possible to provide an electric brake system including an auxiliary device capable of auxiliary generating the hydraulic pressure required for braking when a main device fails or is out of control.

According to an aspect of the disclosed invention, it is possible to provide an electric brake system including an auxiliary device capable of generating braking force using a parking brake when a main device fails or is out of control.

According to an aspect of the disclosed invention, if is possible to provide an electric brake system capable of improving the reliability of braking using a main device that generates the hydraulic pressure for braking, an auxiliary device that auxiliary generates hydraulic pressure, and a parking brake that mechanically stop the wheel.

According to an aspect of the disclosed invention, it is possible to provide an electric brake system capable of providing braking force by controlling a parking brake with ail auxiliary device, in a state in which the hydraulic generation of a main device is impossible (failure or out of control).

According to an aspect of the disclosed invention, it is possible to provide an electric brake system capable of providing braking force in a state in which the hydraulic generation of the main device is impossible (failure or out of control) by controlling a parking brake with a main device and an auxiliary device together.

In this case, it is possible to provide an electric brake system capable of generating braking force using a parking brake.

According to an aspect of the disclosed invention, it is possible to provide an electric brake system capable of improving the reliability of braking by using a hydraulic supply device that generates the hydraulic pressure for braking and a parking brake that mechanically stops wheels.

According to an aspect of the disclosed invention, it is possible to provide an electric brake system capable of providing braking force in a state in which a main controller is out of control by controlling z parking brake with an auxiliary controller supplied with separate electric power.

According to an aspect of the disclosed invention, it is possible to provide an electric brake system capable of providing braking force in a stale in which the hydraulic generation of a hydraulic supply device is impossible (failure or out of control) by controlling a parking brake with a main controller and an auxiliary controller together.

DESCRIPTION OF DRAWINGS

FIG. 1 illustrates a hydraulic structure of an electric brake system according to an embodiment.

FIG. 2 illustrates a hydraulic structure of a main hydraulic device included in an electric brake according to an embodiment.

FIG. 3 illustrates a hydraulic structure of an auxiliary hydraulic device included in an electric brake according to an embodiment.

FIG. 4 illustrates hydraulic and electric control of an electric brake system according to an embodiment.

FIG. 5 illustrates electric configurations of a main device and an auxiliary device included in an electric brake system according to an embodiment.

FIG. 6 illustrates hydraulic and electric control of an electric brake system according to an embodiment.

FIG. 7 illustrates electric configurations of a main device anti an auxiliary device included in an electric brake system according to an embodiment.

FIG. 8 illustrates hydraulic and electric control of an electric brake system according to an embodiment.

FIG. 9 illustrates electric configurations of a main device and an auxiliary device included in an electric brake system according to an embodiment.

FIG. 10 illustrates hydraulic and electric control of an electric brake system according to an embodiment.

FIG. 11 illustrates electric configurations of a main device and an auxiliary device included in an electric brake system according to an embodiment.

FIG. 12 illustrates hydraulic and electric control of an electric brake system according to an embodiment.

FIG. 13 illustrates a hydraulic structure of a hydraulic device included in an electric brake according to an embodiment.

FIG. 14 illustrates an electric configuration of a hydraulic device included in an electric brake system according to an embodiment.

FIG. 15 illustrates a motor driving circuit included in an electric brake system according to an embodiment.

FIG. 16 illustrates a valve driving circuit included in an electric brake system according to an embodiment.

MODE FOR INVENTION

Hereinafter, the operational principle and embodiments of the disclosed invention will be described with reference to the accompanying drawings.

FIG. 1 illustrates a hydraulic structure of an electric brake system according to an embodiment.

As shown in FIG. 1, each of wheels 11, 12, 13, 14 is provided with a brake disc rotating together with each of the wheels 11, 12, 13, 14, and brake calipers 21, 22, 23, 24 for slopping the rotation of the wheels 11, 12, 13, 14. Each of the brake calipers 21, 22, 23, 24 may include, for example, a pair of brake pads provided on both sides of the brake disc to press the brake disc.

The brake calipers 21, 22, 23, 24 include wheel cylinders 31, 32, 33, 34 which receive hydraulic pressure and cause the pair of brake pads to press against the brake disc. For example, the wheel cylinders 31, 32, 33, 34 may include the first wheel cylinder 31 installed on the first brake caliper 21, the second wheel cylinder 32 installed on the second brake caliper 22, the third wheel cylinder 33 installed on the third brake caliper 23, and the fourth wheel cylinder 34 installed on the fourth brake caliper 24.

The electric brake system 10 includes a main device 100 that generates the hydraulic pressure for vehicle braking and an auxiliary device 200 dial auxiliary generates the hydraulic pressure when the main device 100 is unable to generate the hydraulic pressure (failure or out of control).

The main device 100 may generate tire hydraulic pressure for generating braking force in the wheels 11, 12, 13, 14. For example, the main device 100 may detect the driver's intention to brake through the brake pedal 50. The main device 100 may generate the hydraulic pressure based on the moving distance and/or moving speed of the brake pedal 50, and transfer the generated hydraulic pressure to the wheel cylinders 31, 32, 33, 34 through the transmission passages 61, 62, 63, 64. The transmission passages 61, 62, 63, 64 include the first transmission passage 61 connected to the first wheel cylinder 31, the second transmission passage 62 connected to the second wheel cylinder 32, the third transmission passage 63 connected to the three wheel cylinder 33, and the fourth transmission passage 64 connected to the fourth wheel cylinder 34.

The internal pressure of the wheel cylinders 31, 32, 33, 34 may depend on the hydraulic pressure provided from the main device 100. The braking force may be generated in the wheels 11, 12, 13, 14 depending on the internal pressure of the wheel cylinders 31, 32, 33, 34.

The auxiliary device 200 may be provided on the first and second transmission passages 61 and 62 between the main device 100 and the first and second wheel cylinders 31, 32. The auxiliary device 200 may pass the hydraulic pressure provided to the wheel cylinders 31, 32 from the main device 100, or may provide the hydraulic pressure to the wheel cylinders 31, 32.

The auxiliary device 200 may be activated in a state in which the hydraulic generation of the main device 100 is impossible.

The auxiliary device 200 may provide the hydraulic pressure to at least some of the wheel cylinders 31, 32, 33, 34. For example, the auxiliary device 200 may provide the hydraulic pressure to the first wheel cylinder 31 of the first brake caliper 21 and the second wheel cylinder 32 of the second brake caliper 22.

The auxiliary device 200 may receive power from a power network different than that of the main device 100. For example, the auxiliary device 200 may receive power from a power source different than that of the main device 100. As shown in FIG. 1, the main device 100 receives power from a first battery B1, and the auxiliary device 200 receives power from a second battery 82 different from the first battery B1. As another example, the auxiliary device 200 may receive power through a power line different titan that of the main device 100. The main device 100 may receive power from the first battery B1 through the first power line, and the auxiliary device 200 may receive power from the first battery B1 through the second power line.

Parking brakes 41, 42 may be provided on at least some of the brake calipers 21, 22, 23, 24. For example, among the brake calipers 21, 22, 23, 24, the parking brakes 41, 42 may be provided in the third and fourth brake calipers 23 and 24 that cannot receive the hydraulic pressure from the auxiliary device 200. The first parking brake 41 may be provided on the third brake caliper 23, and the second parking brake 42 may be provided on the fourth brake caliper 24.

Each of the first and second parking brakes 41, 42 may be provided with a configuration capable of moving the brake pad by electromechanical force without hydraulic pressure. For example, each of the first and second parking brakes 41, 42 may include a motor having a rotation shaft and a spindle reciprocating by the rotation of the rotation shaft. The spindle may reciprocate the brake pad by rotation of the rotation shaft.

Each of the first and second parking brakes 41, 42 may press the brake pad toward the brake disc in response to an engagement signal. Further, each of the first and second parking brakes 41, 42 may separate the brake pad from the brake disc in response to a release signal.

As described above, the main device KM) may provide the hydraulic pressure for braking to the wheel cylinders 31, 32, 33, 34. The auxiliary device 200 can provide the hydraulic pressure to the first and second wheel cylinders 31, 32 installed in the first and second wheels 11, 12 in a state in which the hydraulic generation of the main device 100 is impossible (failure or out of control).

FIG. 2 illustrates a hydraulic structure of a main hydraulic device included in an electric brake according to an embodiment. FIG. 3 illustrates a hydraulic structure of an auxiliary hydraulic device included in an electric brake according to an embodiment.

The main device 100 may include a main hydraulic device 100a that provides the hydraulic pressure to the wheel cylinders 31, 32, 33, 34 through the transmission passages 61, 62, 63, 64. The auxiliary device 200 may be provided on at least some of the transmission passages 61, 62, 63, 64, and may include an auxiliary hydraulic device 200a to auxiliary provide the hydraulic pressure to at least some of the wheel cylinders 31, 32, 33, 34.

Referring to FIG. 2, the main hydraulic device 100a includes a reservoir 110 in which a pressurized medium such as brake oil is stored, a master cylinder 120 that compresses and discharges the pressurized medium such as brake oil accommodated inside according to the pedal effort of the brake pedal 50, a simulation device 130 that provides reaction force according to the pedal effort of the brake pedal 50 to the driver, a hydraulic supply unit 140 that receives the driver's intention to brake as an electric signal by a pedal displacement sensor 51 that detects the displacement of the brake pedal 50 and generates the hydraulic pressure of the pressurized medium through mechanical operation, a hydraulic control unit 150 that controls the hydraulic pressure provided from the hydraulic supply unit 140, hydraulic circuits 160, 170 that are connected to the wheel cylinders 31, 32, 33, 34 to which the hydraulic pressure of the pressured medium is transferred to brake the wheels 11, 12, 13, 14, a dump control unit 180 that is provided between the hydraulic supply unit 140 and the reservoir 110 to control the flow of the pressurized medium, backup passages 191, 192 that hydraulically connect the master cylinder 120/reservoir 110 and the hydraulic circuits 160, 170, and reservoir passages 115, 116 that hydraulically connect the reservoir 110 and the master cylinder 120.

The pedal displacement sensor 51 may detect a moving distance and moving speed at which the pedal 10 moves according to the driver's intention to brake, and output an electric output signal (displacement signal) dependent on the detected moving distance and moving speed.

The reservoir 110 may accommodate and store the pressurized medium therein, and may be connected to each component to supply or receive the pressurized medium. The reservoir 110 may be hydraulically connected to the master cylinder 110 by the reservoir passages 115, 116.

The master cylinder 120 is configured to include at least one hydraulic chamber, and may compress and discharge the pressurized medium inside. The master cylinder 120 includes a first master chamber 121a and a second master chamber 122a, and a first master piston 121 and a second master piston 122 are provided in the master chambers 121a, 122a.

The first master chamber 121a may be formed on the inlet side (the right side of FIG. 3) of a cylinder block 129 to which the brake pedal 50 is connected, and the first master piston 121a may be accommodated reciprocally in the first master chamber 121a. The first master chamber 121a is connected to the reservoir 110 through the first reservoir passage 115, and the first master chamber 121a is connected to the first hydraulic circuit 160 through the first backup passage 191. The first master piston 121 is provided to be accommodated in the first master chamber 121a, and may compress the pressurized medium accommodated in the first master chamber 121a by advancing or may form negative pressure in the first master chamber 121a by moving backward.

The second master chamber 122a may be formed inside (on the left side with reference to FIG. 3) the first master chamber 121a on the cylinder block 129, and the second master piston 122 may be accommodated reciprocally in live second master chamber 122a. The second master chamfer 122a is connected to the reservoir 110 through the second reservoir passage 116, and the second master chamber 122a is connected to the simulation device 130 through the simulation passage 131. The second master piston 122 is provided to be accommodated in the second master chamber 122a, and may compress the pressurized medium accommodated in the second master chamber 122a by advancing, or may form a negative pressure in the second master chamber 122a by moving backward.

The simulation device 130 may provide the reaction force with respect to the pedal force for the driver's operation of the brake pedal 50. The simulation device 130 may provide a pedal feel to the driver by providing the reaction force in response to the pedal force applied by the driver to the brake pedal 50.

The simulation device 130 includes a simulation passage 131 connected to the second master chamber 122a and a pedal simulator 132 provided in the simulation passage 131.

The hydraulic supply unit 140 may implement the reciprocating movement of the hydraulic piston 142 in response to the driver's intention to brake, and may generate the hydraulic pressure of the pressurized medium through the reciprocating movement of the hydraulic piston 142.

The hydraulic supply unit 140 includes a cylinder block 141 provided to accommodate the pressurized medium, a hydraulic piston 142 accommodated in the cylinder block 141, and pressure chambers 143, 144 partitioned by the hydraulic piston 142.

The pressure chambers 143, 144 may include a first pressure chamber 143 positioned in front of the hydraulic piston 142 (a left side of the hydraulic piston 142 with reference to FIG. 3), and a second pressure chamber 144 positioned in a rear of the hydraulic piston 142 (a right side of the hydraulic piston 142 with reference to FIG. 3).

The first pressure chamber 143 is partitioned by the cylinder block 141 and the front surface of the hydraulic piston 142 so that the volume is changed according to the movement of the hydraulic piston 142. In addition, the second pressure chamber 144 is partitioned by the cylinder block 141 and the rear surface of the hydraulic piston 142 so that the volume is changed according to the movement of the hydraulic piston 142.

The first pressure chamber 143 may be hydraulically connected to the hydraulic control unit 150 to be described later through a hydraulic passage. Also, the second pressure chamber 144 may be hydraulically connected to the hydraulic control unit 150 through a hydraulic passage.

The hydraulic supply unit 140 also includes a first motor 146 that generates a rotational force, and a power conversion unit 147 that converts the rotational force of the first motor 146 into translational movement of the hydraulic piston 142.

The hydraulic control unit 150 is provided between the hydraulic supply unit 140 and the wheel cylinders 31, 32, 33, 34, and may guide the hydraulic pressure generated by the hydraulic supply unit 140 to the wheel cylinders 31, 32, 33, 34. For example, the hydraulic control unit 150 may guide the hydraulic pressure generated in the first pressure chamber 143 to the wheel cylinders 31, 32, 33, 34 while the hydraulic piston 142 advances, and guide the hydraulic pressure generated in the second pressure chamber 144 to the wheel cylinders 31, 32, 33, 34 while the hydraulic piston 142 moves backward.

The hydraulic control unit 150 is branched into a first hydraulic circuit 160 and a second hydraulic circuit 170. The hydraulic control unit 150 includes a plurality of hydraulic passages and a solenoid valve between the hydraulic supply unit 140 and the first and second hydraulic circuits 160 and 170 to control the hydraulic pressure transferred from the hydraulic supply unit 140.

The first hydraulic circuit 160 may control the flow of hydraulic pressure transferred to the first and second wheel cylinders 31, 32. The first hydraulic circuit 160 may guide the hydraulic pressure generated by the master cylinder 120 or the hydraulic supply unit 140 to the first and second wheel cylinders 31, 32, and also discharge the pressurized medium of the first and second wheel cylinders 31, 32 to the reservoir 110.

The second hydraulic circuit 170 may control the flow of hydraulic pressure transferred to the third and fourth wheel cylinders 33, 34. The second hydraulic circuit 170 may guide the hydraulic pressure generated by the master cylinder 120 or the hydraulic supply unit 140 to the third and fourth wheel cylinders 33, 34, and also discharge the pressurized medium of the third and fourth wheel cylinders 33, 34 to the reservoir 110.

The first and second hydraulic circuits 160, 170 include first, second, third, and fourth inlet valves 161a, 161b, 171a, 171b that control the flow of pressurized medium flowing towards the first, second, third and fourth wheel cylinders 31, 32, 33, 34 respectively, first, second, third, and fourth check valves 163a, 163b, 173a, 173b that are provided in parallel with respect to the first, second, third, and fourth inlet valves 161a, 161b, 171a, 171b, and first, second, third and fourth outlet valves 162a, 162b, 172a, 172b that control the flow of the pressurized medium discharged to the reservoir to improve performance when the brakes of the first, second, third, and fourth wheel cylinders 31, 32, 33, 34 are released. The first, second, third, and fourth inlet valves 161a, 161b, 171a, 171b may be implemented as normal open valves. The first, second, third, and fourth outlet valves 162a, 162b, 172a, 172b may be implemented as normal closed valves.

A dump control unit 180 is provided between the hydraulic supply unit 140 and the reservoir 110, and can control the supply of the pressurized medium from the reservoir 110 to the first and second pressure chambers 143, 144. For example, while the hydraulic piston 142 is advancing, the dump control unit 180 blocks the outflow of the pressurized medium from the first pressure chamber 143 to the reservoir 110 and allows the supply of the pressurized medium from the reservoir 110 to the second pressure chamber 144. Also, while the hydraulic piston 142 is moving backward, the dump control unit 180 blocks the outflow of the pressurized medium from the second pressure chamber 144 to the reservoir 110 and allows the supply of the pressurized medium from the reservoir 110 to the first pressure chamber 143.

The main hydraulic device 100a may include first and second backup passages 191, 192 that can implement braking by directly supplying the pressurized medium discharged from the master cylinder 120 to the wheel cylinder when normal operation is impossible due to a malfunction of the device, A mode in winch the hydraulic pressure of the master cylinder 120 is directly transferred to the wheel cylinder is referred to as a first fallback mode.

The first backup passage 191 connects the first master chamber 111a of the master cylinder 120 to the first hydraulic circuit 160, and the second backup passage 192 connects the reservoir 110 to the second hydraulic circuit 170. A first cut valve 195 that controls the bidirectional flow of the pressurized medium is provided in the first backup passage 191, and a second cut valve 196 that controls the bidirectional flow of the pressurized medium is provided in the second backup passage 192. The first cut valve 195 and the second cut valve 196 may be implemented as normal open solenoid valves.

When the first and second cut valves 195, 196 are closed, the pressurized medium of the master cylinder 120 is prevented from being transferred directly to the wheel cylinders 31, 32 and the hydraulic pressure provided from the hydraulic supply unit 140 is provided to the wheel cylinders 31, 32, 33, 34 through this hydraulic control unit 150. When the first cut valve 195 is opened, the pressurized medium compressed in the master cylinder 120 may be directly supplied to the wheel cylinders 31, 32 through the first backup passage 191.

The main hydraulic device 100a includes a first primary pressure sensor PS1a and a first secondary pressure sensor PS1b that sense the hydraulic pressure of the pressurized medium provided by the hydraulic supply unit 140 and output an electric output signal (pressure signal) dependent on the sensed hydraulic pressure. For example, the first primary pressure sensor PS1a is provided on the simulator passage 131 and the first secondary pressure sensor PS1b is provided upstream of the first hydraulic circuit 160 to sense the hydraulic pressure of the pressurized medium. However, the position and number of the pressure sensor are not limited, and the pressure sensors may be provided in various numbers at various locations as long as it can sense hydraulic pressure.

Referring to FIG. 3, the auxiliary hydraulic device 200a is provided between the first hydraulic circuit 160 and the first and second wheel cylinders 31, 32, and may be activated when the main hydraulic device 100a is inoperable due to a failure and the like to provide the hydraulic pressure to the first and second wheel cylinders 31, 32. A mode in which the auxiliary hydraulic device 200a operates due to the inability of the main hydraulic device 100a is referred to as a second fallback mode.

The auxiliary hydraulic device 200a includes a first isolation valve 251 that controls the flow of pressurized medium provided from the main hydraulic device 100a to the first wheel cylinder 31, a second isolation valve 252 that controls the flow of the pressurized medium transferred from the main hydraulic device 100a to the second wheel cylinder 32, a pump unit 210 that, compresses the pressurized medium, a first auxiliary hydraulic circuit 221 that transfers the pressurized medium compressed by the pump unit 210 to the first wheel cylinder 31, and a second auxiliary hydraulic circuit 222 that transfers the pressurized medium compressed by the pump unit 210 to the second wheel cylinder 32.

When the main hydraulic device 100a is in a failure or out of control state, it may be switched to the second fallback mode. The first and second isolation valves 251, 252 are closed, and the pump unit 210 can be operated.

The first and second isolation valves 251, 252 are provided on the first and second transmission passages 61, 62, respectively, and can allow or block the hydraulic connections of the main hydraulic device 100a and the first and second wheel cylinders 31, 32.

The first and second isolation valves 251, 1652 may allow the hydraulic connection between the main hydraulic device 100a and the First and second wheel cylinders 31, 32 in the normal operation mode and the first fallback mode, and may block the hydraulic connection between the main hydraulic device 100a and the wheel cylinders 31, 32 in the second fallback mode in which the auxiliary hydraulic device 200a operates.

The first and second isolation valves 251, 252 are provided downstream of the First hydraulic circuit 160 to allow or block the flow of the pressurized medium. The first and second isolation valves 251, 252 may be provided as normal open solenoid valves.

The pump unit 210 may receive the pressurized medium from the reservoir 110 to pressurize the pressurized medium. The pump unit 210 may include a First pump 211 and a second pump 212, and the First pump 211 and the second pump 212 may be driven by the second motor 213.

The first auxiliary hydraulic circuit 221 includes a first auxiliary hydraulic passage 231 that transfers the pressurized medium compressed by the pump unit 210 to the first wheel cylinder 31, a first support valve 231a that is provided in the first auxiliary hydraulic passage 231 to control the flow of the pressurized medium, a first auxiliary dump passage 241 that discharges the pressurized medium applied to the First wheel cylinder 31, and a first discharge valve 241a that is provided in the first auxiliary dump passage 241 to control the flow of the pressurized medium. The First support valve 231a and the first discharge valve 241a may be implemented as normal closed solenoid valves.

The pressurized medium pressed by the first pump 211 may be transferred to the first wheel cylinder 31 by the first auxiliary hydraulic passage 231 provided as the discharge side passage of the first pump 211. The first auxiliary hydraulic passage 231 is provided with a first support valve 231a that controls the flow of the pressurized medium transferred from the pump unit 210 to the first wheel cylinder 31. The pressurized medium applied to the first wheel cylinder 31 may be discharged through the first auxiliary dump passage 241. A first discharge valve 241a that controls the flow of the pressurized medium discharged from the first wheel cylinder 31 is provided in the first auxiliary dump passage 241.

The second auxiliary hydraulic circuit 222 includes a second auxiliary hydraulic passage 232 that transfers the pressurized medium compressed by the pump unit 210 to the second wheel cylinder 32, a second support valve 232a that is provided in the second auxiliary hydraulic passage 232 to control the flow of the pressurized medium, a second auxiliary dump passage 242 that discharges the pressurized medium applied to the second wheel cylinder 32, and a second discharge valve 242a that is provided in the second auxiliary dump passage 242 to control the flow of the pressurized medium. The second support valve 232a and the second discharge valve 242a may be implemented as normal closed solenoid valves.

The pressurized medium pressed by the second pump 212 may be transferred to the second wheel cylinder 32 by the second auxiliary hydraulic passage 232 provided as the discharge side passage of the second pump 212. The second auxiliary hydraulic passage 232 is provided with a second support valve 232a that controls the flow of the pressurized medium transferred from the pump unit 210 to the second wheel cylinder 32. The pressurized medium applied to the second wheel cylinder 32 may be discharged through tire second auxiliary dump passage 242. A second discharge valve 242a that controls the flow of the pressurized medium discharged from the second wheel cylinder 32 is provided in the second auxiliary dump passage 242.

The auxiliary hydraulic device 200a includes a second pressure sensor PS2 that senses the hydraulic pressure of the pressurized medium and outputs an electric output signal (pressure signal) dependent on the sensed hydraulic pressure. Tor example, the second pressure sensor PS2 may be disposed between the first auxiliary hydraulic passage 231 and the second auxiliary hydraulic passage 232. However, the position and number of the second pressure sensor PS2 are not limited, and the second pressure sensors may be provided in various numbers at various locations as long as it can sense hydraulic pressure.

FIG. 4 illustrates hydraulic and electric control of an electric brake system according to an embodiment. FIG. 5 illustrates electric configurations of a main device and an auxiliary device included in the electric brake according to an embodiment.

Referring to FIGS. 4 and 5, the main device 100 is fluidly connected to the wheel cylinders 31, 32, 33, 34 through the transmission passages 61, 62, 63, 64, and may provide the hydraulic pressure for vehicle braking to the wheel cylinders 31, 32, 33, 34.

The auxiliary device 200 is provided on the first and second transmission passages 61, 62. Also, the auxiliary device 200 is electrically connected to the parking brakes 41, 42. The auxiliary device 200 may control each of the first and second parking brakes 41, 42 through electric connection. For example, the auxiliary device 200 provides an engagement signal to each of the first and second parking brakes 41, 42 so that the parking brake is engaged, or provides the engagement signal to each of the first and second parking brakes 41, 42 so that the parking brake is released.

The main device 100 includes a main hydraulic device 100a and a first controller 100b.

The main hydraulic device 100a includes a pedal displacement sensor 51, first pressure sensors PS1a and PS1b, a pressure supply unit 140, and a first valve block 105. The pedal displacement sensor 51, the first pressure sensors PS1a, PS1b and the pressure supply unit 140 may be the same as the pedal displacement sensor 51, the first pressure sensors PS1a, PS1b and the pressure supply unit 140 described in conjunction with FIG. 3. In addition, the first valve block 105 may include the valves of the main hydraulic device 100a described in conjunction with FIG. 3.

The first controller 100b may include a plurality of semiconductor devices, and may be variously referred to as an Electric control Unit (ECU). The first controller 100b may include, for example, a plurality of processors and/or a plurality of memories.

The first controller 100b includes a first processor 101, a first driving circuit 103, and a first power circuit 102.

The first processor 101 may control the hydraulic supply unit 140 and the first valve block 105 based on the output signal (displacement signal) of the pedal displacement sensor 51 and the output signal (pressure signal) of the first pressure sensors PS1a, PS1b.

The first processor 101 may include a CAN transceiver that receives a communication signal from the auxiliary device 200 through a vehicle communication network NT and transmits the communication signal to the auxiliary device 200. For example, the CAN transceiver may transmit to the auxiliary device 200 the communication signal indicating a state in which the hydraulic generation of the main device 100 is impossible (a state of failure or out of control) under the control of the first processor 101.

The first processor 101 may include a memory that records/stores the program and data for vehicle braking depending on the driver's intention to brake. In addition, the memory may provide the programs and data to the first processor 101, and record temporary data generated during an arithmetic operation of the first processor 101a. The memory may include a volatile memory such as a Static Random Access Memory (S-RAM) and a Dynamic Random Access Memory (D-RAM) and the like, and a non-volatile memory such as a Read Only Memory (ROM), an Erasable Programmable Memory (EPROM), a flash memory and the like.

The first processor 101 may provide a control signal to the pressure supply unit 140 and the valve of the first valve block 10S based on the displacement signal of the pedal displacement sensor 51 and the pressure signal of the first pressure sensors PS1a, PS1b according to the program and data stored in the memory. For example, the first processor 101 may provide a driving signal for generating hydraulic pressure to the hydraulic supply unit 140, and may provide an open/close signal for guiding the hydraulic pressure to the wheel cylinders 31, 32, 33, and 34 to the valves of the first valve block 105.

According to the program and data stored in the memory, the first processor 101a may identify the hydraulic generation impossible state (a state of failure or out of control) of the components (e.g., a pressure sensor, a pressure generation device, and valves) included in the main device 100. In response to the identification of the hydraulic generation impossible state of the main device 100, the first processor 101 may transmit the communication signal indicating the hydraulic generation impossible state of the main device 100 to the auxiliary device 200.

The first processor 101 may include one semiconductor device or a plurality of semiconductors. Also, the first processor 101 may include one core or a plurality of cores within one semiconductor device. The first processor 101 may be referred variously, such as a micro controller unit (MCU) and the like.

The first power circuit 102 may include a voltage circuit that receives power from the first battery B1 and converts the voltage of the received power into various voltages. The first power circuit 102 may distribute the power having the converted voltage to each component of the main device 100. For example, the first power circuit 102 may receive the power of 15V from the first battery B1 and provide the power of 15V to the first driving circuit 103. Also, the first power circuit 102 may convert the power of 15V into the power of 5V and provide the power of 5V to the first processor 101.

The first driving circuit 103 may include a driving circuit that receives a control signal from the first processor 101 and provides a driving current to the first motor 141 of the hydraulic supply unit 140 in response to the control signal. For example, the first driving circuit 103 may include an inverter circuit that converts DC power supplied from the first power circuit 102 into AC power, and the inverter circuit may supply the converted AC power to the first motor 41 in response to the control signal of the first processor 101.

In addition, the auxiliary device 200 includes an auxiliary hydraulic device 200a and a second controller 200b.

The auxiliary hydraulic device 200a includes a second pressure sensor PS2, a pump unit 210, and a second valve block 205. The second pressure sensor PS2 and the pump unit 210 may be the same as the second pressure sensor PS2 and the pump unit 210 described in conjunction with FIG. 4. In addition, the second valve block 205 may include the valves of the auxiliary hydraulic device 200a described in conjunction with FIG. 4.

The second controller 200b may include a plurality of semiconductor devices, and may be variously referred to as ECU and the like. The second controller 200b may include, for example, a plurality of processors and/or a plurality of memories.

The second controller 100b includes a second processor 201, a second driving circuit 203, and a second power circuit 202.

The second processor 201 may receive from the main device 100 the communication signal indicating the hydraulic generation impossible state (a state of failure or out of control), and control the pump unit 210 and the second valve block 205 based on the displacement signal of the pedal displacement sensor 51 and the pressure signal of the second pressure sensor PS2. The second processor 201 may directly obtain the displacement signal from the pedal displacement sensor 51 through a hard wire, or may receive the displacement signal from the main device 100 through a vehicle communication network NT.

In addition, the second processor 201 may provide the parking signal (engagement signal or release signal) for engaging or releasing the parking brakes 41, 42 to the parking brakes 41, 42. The second processor 201 may directly provide the parking signal to the parking brakes 41, 42 through a hard wire or transmit the parking signal to the parking brakes 41, 42 through the vehicle communication network NT.

The second processor 201 includes a memory that records/stores the program and data for controlling the CAN transceiver and the auxiliary hydraulic device 200a that communicate with the main device 100 through the vehicle communication network NT.

The second processor 201 may provide the first and second parking brakes 41, 42 with the parking signal that engages or releases the first and second parking brakes 41, 42 according to the program and data stored in the memory. For example, the second processor 201 may receive the parking command for engaging or releasing the first and second parking brakes 41, 42 directly from the parking lever or parking button of the vehicle 1 or via the vehicle communication network NT, and may provide the parking signal to the first and second parking brakes 41, 42 in response to the parking command.

In response to the engagement signal of the second processor 201, each of the first and second parking brakes 41, 42 may press the brake pad toward the brake disc with an electro-mechanical force. Further, in response to the release signal of the second processor 201, each of the first and second parking brakes 41, 42 may separate the brake pad from the brake disc with an electro-mechanical force.

The second power circuit 202 may receive power from the second battery B2 and convert the voltage of the received power into various voltages. The second power circuit 202 may distribute the power having the converted voltage to each component of the auxiliary device 200. For example, the second power circuit 202 may receive the power of 15V from the second battery B2 and provide the power of 15V to the second driving circuits 203. Also, the second power circuit 202 may convert the power of 15V into the power of 5V and provide the power of 5V to the second processor 201.

However, the second power circuit 202 is not limited to receiving power from the second battery B2, and it is sufficient as long as the second power circuit 202 receives power through other power network different from that of the main device 100. For example, the second power circuit 202 may receive power from the first battery B1 through a power line different from that of the main device 100.

The second driving circuit 203 may include a driving circuit that receives a control signal from the second processor 201 and provides a driving current to the second motor 213 of the pump unit 210 in response to the control signal. For example, the second driving circuit 203 may include an inverter circuit that converts DC power supplied from the second power circuit 202 into AC power, and the inverter circuit may supply the convened AC current to the second motor 213 in response to the control signal of the second processor 201.

As described above, the main device 100 may provide the hydraulic pressure to the wheel cylinders 31, 32, 33, 34 in response to the driver's intention to brake, and the auxiliary device 100 may provide the hydraulic pressure to the first and second wheel cylinders 31, 32 installed in the first and second wheels 11, 12 among the wheel cylinders 31, 32, 33, 34 in the hydraulic generation impossible stale (a suite of failure or out of control). In addition, the auxiliary device 200 may control the first and second parking brakes 41, 42 in order to engage or release the first and second parking brakes 41, 42 installed on the third and fourth wheels 13 and 14, respectively.

Therefore, in the hydraulic generation impossible state of the main device 100, the auxiliary device 200 can brake the vehicle in response to the driver's intention to brake, thereby improving the reliability of the electric brake system 10.

FIG. 6 illustrates the hydraulic and electric control of an electric brake system according to an embodiment. FIG. 7 illustrates the electric configurations of a main device and an auxiliary device included in an electric brake according to an embodiment.

As shown in FIG. 6, the main device 100 is fluidly connected to the wheel cylinders 31, 32, 33, 34 through the transmission passages 61, 62, 63, 64, and may provide the hydraulic pressure for vehicle braking to the wheel cylinders 31, 32, 33, 34.

The main device 100 is electrical y connected to the first parking brake 41 installed on the third wheel 13, and may control the first parking brake 41. In other words, the main device 100 may control to engage or release the first parking brake 41.

The auxiliary device 200 is provided on the first and second transmission passages 61, 62 between the main device 130 and the first and second wheel cylinders 31, 32, and may provide the hydraulic pressure for vehicle braking to the first and second wheel cylinders 31, 32.

The auxiliary device 200 is electrically connected to the second parking brake 42 installed on the fourth wheel 14, and may control the second parking brake 42. In other words, the auxiliary device 200 may control to engage or release the first parking brake 41.

The main device 100 includes a main hydraulic device 100a and a first controller 100b. The configurations of the main hydraulic device 100a and the first controller 100b may be the same as those of the main hydraulic device 100a and the first controller 100b shown in FIGS. 4 and 5.

However, the first processor 101 of the first controller 100b may control the first parking brake 41 installed on the third wheel 13. Specifically, the first processor 101 may receive the parking command for engaging or releasing the parking brakes 41, 42 directly from the parking lever or parking button of the vehicle 1 or via the vehicle communication network NT. The first processor 101 may provide the engagement signal or the release signal to the first park ng brake 41 in response to the engagement command or the release command. In response to the engagement signal or the release signal of the first processor 101, the first parking brake 41 may be engaged or released. Also, the first processor 101 that has provided the engagement signal or the release signal to the first parking brake 41 may transmit the message indicating the engagement or release of the first parking brake 41 to the auxiliary device 200.

Also, the first processor 101 may receive the parking command for engaging or releasing the first parking brake 41 from the auxiliary device 200. The first processor 101 may provide the engagement signal or the release signal to the first parking brake 41 in response to the engagement command or the release command of the auxiliary device 200.

The auxiliary device 200 includes an auxiliary hydraulic device 200a and a second controller 200b. The configurations of the auxiliary hydraulic device 200a and the second controller 200b may be the same as those of the auxiliary hydraulic device 200a and the second controller 200b illustrated in FIGS. 4 and 5.

However, the second processor 201 of the second controller 200b may control the second parking brake 42 installed on the fourth wheel 14. Specifically, the second processor 201 may receive the parking command for engaging or releasing the parking brakes 41, 42 directly from the parking lever or parking button of the vehicle 1 or via the vehicle communication network NT. The second processor 201 may provide the engagement signal or the release signal to the second parking brake 42 in response to the engagement command or the release command. In response to the engagement signal or the release signal of the second processor 201, the second parking brake 42 may be engaged or released. Also, the second processor 201 that has provided the engagement signal or the release signal to the second parking brake 42 may transmit the message indicating engagement or release of the second parking brake 42 to the main device 100.

The second processor 201 may receive the parking command for engaging or releasing the second parking brake 42 from the main device 100. The second processor 201a may provide the engagement signal or the release signal to the second parking brake 42 in response to the engagement command or the release command of the main device 100.

As described above, in the hydraulic generation impossible state, the main device 100 may control the first parking brake 41 to engage or release the first parking brake 41 installed on the third wheel 13. In addition, the auxiliary device 100 may control the second parking brake 42 to engage or release the second parking brake 42 installed on the fourth wheel 14.

Therefore, in the hydraulic generation impossible state of the main device 100, the mam device 100 and the auxiliary device 200 can brake the vehicle hi response to the driver's intention to brake, thereby improving the reliability of the electric brake system 10.

FIG. 8 illustrates hydraulic and electric controls of an electric brake system according to an embodiment, FIG. 9 illustrates electric configurations of a main device and an auxiliary device included in the electric brake according to an embodiment.

As shown in FIG. 8, the main device 100 is fluidly connected to the wheel cylinders 31, 32, 33, 34 through the transmission passages 61, 62, 63, 64, and may provide the hydraulic pressure for vehicle braking to the wheel cylinders 31, 32, 33, 34.

The main device 100 is electrically connected to the first and second parking brakes 41, 42 installed on the third and fourth wheels 13, 14, and may control the first and second parking brakes 41, 42. In other words, the main device 100 may control to engage or release each of the first and second parking brakes 41, 42.

The auxiliary device 200 is provided on the first and second transmission passages 61 and 62 between the main device 100 and the first and second wheel cylinders 31, 32, and may provide the hydraulic pressure for vehicle braking to the first and second wheel cylinders 31, 32.

The auxiliary device 200 is electrically connected to the first and second parking brakes 41, 42 installed on the third and fourth wheels 13, 14, and may control the first and second parking brakes 41, 42. In other words, the auxiliary device 200 may control to engage or release each of the first and second parking brakes 41, 42.

The main device 100 includes a main hydraulic device 100a and a first controller 100b. The configurations of the main hydraulic device 100a and the first controller 100b may be the same as those of the main hydraulic device 100a and the first controller 100b shown in FIGS. 4 and 5.

However, the first processor 101 of the first controller 101b may control the first and second parking brakes 41, 42 installed on the third and fourth wheels 13, 14. Specifically, the first processor 101 may receive the parking command for engaging or releasing the parking brakes 41, 42 directly from the parking lever or parking button of the vehicle 1 or via the vehicle communication network NT. The first processor 101a may provide the engagement signal or the release signal to each of the first and second parking brakes 41, 42 in response to the engagement command or the release command. In response to the engagement signal or the release signal of the first processor 101, each of the first and second parking brakes 41, 42 may be engaged or released. In addition, the first processor 101a that has provided the engagement signal or the release signal to the first and second parking brakes 41, 42 may transmit the message indicating engagement or release of the first and second parking brakes 41, 42 to the auxiliary device 200.

The auxiliary device 200 includes an auxiliary hydraulic device 200a and a second controller 200b. The configurations of the auxiliary hydraulic device 200a and the second controller 200b may be the same as those of the auxiliary hydraulic device 200a and the second controller 200b illustrated in FIGS. 4 and 5.

However, the second processor 201 of the second controller 200b may control the first and second parking brakes 41, 42 installed on the third and fourth wheels 13, 14, respectively. Specifically, the second processor 201 may receive the parking command for engaging or releasing the parking brakes 41, 42 directly from the parking lever or parking button of the vehicle 1 or via the vehicle communication network NT. The second processor 201 may provide the engagement signal or the release signal to each of the first and second parking brakes 41, 42 in response to the engagement command or the release command. In response to the engagement signal or the release signal of the second processor 201a, each of the first and second parking brakes 41, 42 may be engaged or released.

The second processor 201 may wait for a predetermined time after receiving the parking command for engaging or releasing the parking brakes 41, 42. If the message indicating the engagement or release of the first and second parking brakes 41, 42 is not received from the main device 100 within a predetermined time, the second processor 201 may provide the engagement signal or the release signal to the first and second parking brakes 41, 42. On the other hand, if the message indicating engagement or release of the first and second parking brakes 41, 42 is received from the main device 100 within a predetermined time, the second processor 201 may not provide the engagement signal or the release signal to each of the first and second parking brakes 41, 42.

As described above, in the hydraulic generation impossible state, the main device 100 may control each of the first and second parking brakes 41, 42 so that the first and second parking brakes 41, 42 installed on the third and fourth wheels 13, 14 are engaged or released, and the auxiliary device 100 may also control the first and second parking brakes 41, 42 to engages or releases the first and second parking brakes 41, 42.

Therefore, in the hydraulic generation impossible state of the main device 100, the main device 100 and the auxiliary device 200 can brake the vehicle in response to the driver's intention to brake, thereby improving the reliability of the electric brake system 10.

FIG. 10 illustrates hydraulic and electric controls of an electric brake system according to an embodiment. FIG. 11 illustrates electric configurations of a main device and an auxiliary device included in an electric brake according to an embodiment.

Referring to FIGS. 10 and 11, the Main device 100 is fluidly connected to the wheel cylinders 31, 32, 33, 34 through the transmission passages 61, 62, 63, 64, and may provide the hydraulic pressure for vehicle braking to the wheel cylinders 31, 32, 33, 34. Also, the main device 100 is electrically connected to the parking brakes 41, 42. The main device 100 may control each of the first and second parking brakes 41, 42. Specifically, the main device 100 may provide the engagement signal or the release signal to the first parking brake 41, and may also provide only the release signal to the second parking brake 42.

The auxiliary device 200 is provided on rite first and second transmission passages 61, 62. Also, the auxiliary device 200 is electrically connected to the parking brakes 41, 42. The auxiliary device 200 may control each of the first and second parking brakes 41, 42. Specifically, the auxiliary device 200 may provide the engagement signal or the release signal to the second parking brake 42, and may also provide only the release signal to the first parking brake 41.

The main device 100 includes the main hydraulic device 100a and the first controller 100b.

The configurations of the main hydraulic device 100a and the first controller 100b may be the same as those of the main hydraulic device 100a and the first controller 100b shown in FIGS. 4 and 5.

However, the first processor 101 of the first controller 100b may control the first parking brake 41 installed on the third wheel 13. The first processor 101 may provide the parking signal for engaging or releasing the first parking brake 41 to the first parking brake 41 according to the program and data stored in the memory. For example, the first processor 101 may receive the parking command for engaging or releasing the parking brakes 41, 42 directly from the parking lever or parking button of the vehicle or via the vehicle communication network NT, and may provide die engagement signal or the release signal to the first parking brake 41 in response to the parking command. In response to the engagement signal or the release signal of the first processor 101, the first parking brake 41 may be engaged or released. Also, the first processor 101 that has provided the engagement signal or the release signal to the first parking brake 41 may transmit the message indicating the engagement or release of the first parking brake 41 to the auxiliary device 200.

Also, the first processor 101 may release the second parking brake 42 installed on the fourth wheel 14. The first processor 101 may receive the parking command for engaging or releasing the parking brakes 41, 42 directly from the parking lever or parking button of the vehicle or via the vehicle communication network NT. If the message indicating release of the second parking brake 42 is not received from the auxiliary device 200 within a predetermined time after receiving the parking command for engaging the parking brakes 41, 42, the first processor 101 may provide the parking signal for releasing the second parking brake 42 to the second parking brake 42. In response to the release signal of the first processor 101, the second parking brake 42 may be released.

The auxiliary device 200 includes the auxiliary hydraulic device 200a and the second controller 200b. The configurations of the auxiliary hydraulic device 200a and the second controller 200b may be the same as those of the auxiliary hydraulic device 200a and the second controller 200b illustrated in FIGS. 4 and 5.

However, the second processor 201 of the second controller 200b may control the second parking brake 42 installed on the fourth wheel 14. The second processor 201 may provide the parking signal for engaging or releasing the second parking brake 42 to the second parking brake 42 according to the program anti data stored in the memory. For example, the second processor 201 may receive the parking command for engaging or releasing the parking brakes 41, 42 directly from the parking lever or parking button of the vehicle or via the vehicle communication network NT, and may provide the engagement signal or the release signal to the second parking brake 42 in response to the parking command. In response to the engagement signal or the release signal of the second processor 201, the second parking brake 42 may be engaged or released. Also, the second processor 201 that has provided the engagement signal or the release signal to the second parking brake 42 may transmit the message indicating engagement or release of the second parking brake 42 to the main device UK).

The second processor 201 may release the first parking brake 41 installed on the third wheel 13. The second processor 201 may receive the parking command for engaging or releasing the parking brakes 41, 42 directly from the parking lever or parking button of the vehicle or via the vehicle communication network NT. If the message indicating the release of the first parking brake 41 is not received from the main device 100 within a predetermined time after receiving die parking command for engaging the parking brakes 41, 42, the second processor 201 may provide the parking signal for releasing the first parking brake 41 to the first parking brake 41. In response to the release signal of the second processor 201, the first parking brake 41 may be released.

As described above, die main device 100 may control each of the first and second parking brakes 41, 42 to release the first and second parking brakes 41, 42, respectively, and may control the first parking brake 41 to engage the brake 41. The main device 100 may control each of the first and second parking brakes 41, 42 to release the first and second parking brakes 41, 42, and may control the second parking brake 42 to engage the second parking brake 42.

Therefore, in the hydraulic generation impossible state of the main device 100, the auxiliary device 200 may brake the vehicle in response to the driver's intention to brake, thereby improving the reliability of the electric brake system 10.

FIG. 12 illustrates the hydraulic structure of an electric brake system according to an embodiment.

As shown in FIG. 12, the wheels 11, 12, 13, and 14 are provided with brake calipers 21, 22, 23, 24 and the brake calipers 21, 22, 23, 24 include the wheel cylinders. 31, 32, 33, 34. In addition, the parking brakes 41, 42 may be provided on at least some of the brake calipers 21, 22, 23, 24.

The wheels 11, 12, 13, 14, the brake calipers 21, 22, 23, 24, the wheel cylinders 31, 32, 33, 34 and the parking brakes 41, 42 may be the same as those in shown in FIG. 1.

The electric brake system 10 includes a hydraulic device 300 that generates the hydraulic pressure for vehicle braking, and a first controller 400 and a second controller 500 that control the operation of the hydraulic device 300.

The hydraulic device 300 may generate the hydraulic pressure for generating braking force in the wheels 1, 12, 13, 14. The hydraulic device 300 may detect the driver's intention to brake through, for example, the brake pedal 50 (refer to FIG. 13). The hydraulic device 300 may generate the hydraulic pressure based on the moving distance and/or moving speed of the brake pedal 50, and provide the generated hydraulic pressure to the wheel cylinders 31, 32, 33, 34 through the transmission passages 61, 62, 63, 64. The transmission passages 61, 62, 63, 64 include a first transmission passage 61 connected to the first wheel cylinder 31, a second transmission passage 62 connected to the second wheel cylinder 32, a third transmission passage 63 connected to the three wheel cylinder 33 and a fourth transmission passage 64 connected to the fourth wheel cylinder 34.

The internal pressure of the wheel cylinders 31, 32, 33, 34 may depend on die hydraulic pressure provided from the hydraulic device 300. A braking force may be generated in the wheels 11, 12, 13, 14 depending on the internal pressure of the wheel cylinders 31, 32, 33, 34.

The first controller 400 and the second controller 500 may control the operation of the hydraulic device 300. For example, the first controller 400 and the second controller 500 may control hydraulic supply device 300 to generate the hydraulic pressure based on the output of the pedal displacement sensor 51 (refer to FIG. 13).

The first controller 400 and the second controller 500 may operate complementary to each other. For example, the first controller 400 may control the operation of the hydraulic device 300, and the second controller 500 may be deactivated while the first controller 400 controls the operation of the hydraulic device 300. On the other hand, when the first controller 400 is in an inoperable state (e.g., power is cut off or failure, etc.), the second controller 500 may control the operation of the hydraulic device 300.

The first controller 400 and the second controller 500 may control the first parking brake 41 and the second parking brake 42. At least one of the first controller 400 and the second controller 500 may provide the engagement signal to each of the first and second parking brakes 41, 42 so that the parking brake is engaged in response to a driver's engagement command through the parking button and the like, or may provide the engagement signal to each of the first and second parking brakes 41, 42 so that the parking brake is released in response to the driver's release command through the parking button and the like.

For example, the first controller 400 may control the operation of the first and second parking brakes 41, 42, and the second controller 500 may be deactivated while the first controller 400 controls the operation of the first and second parking brakes 41, 42. On the other hand, when the first controller 400 is in the inoperable state (e.g., power cut off or failure, etc.), the second controller 500 may control the operation of the first and second parking brakes 41, 42.

As another example, the second controller 500 may control the operations of the first and second parking brakes 41, 42. In other words, while the first controller 400 controls the operation of the hydraulic device 300, the second controller 500 may control the operations of the first and second parking brakes 41, 42, and also even when the first controller 400 is in an inoperable state, the second controller 500 may control the operations of the first and second parking brakes 41, 42.

As such, the first controller 400 and the second controller 500 may provide redundancy. To provide redundancy, the first controller 400 and the second controller 500 may receive power from different power networks. For example, as shown in FIG. 12, the first controller 400 may receive power from the first battery B1, and the second controller 500 may receive power from the second battery B2. However, the first controller 400 and the second controller 500 are not limited to receiving power from different batteries B1, B2, and the first controller 400 and the second controller 500 may receive power from the same battery through different power lines.

As described above, the brake system 10 may include the first controller 400 and the second controller 500 that provide redundancy. Therefore, the reliability of the electric brake system 10 can be improved.

FIG. 13 illustrates a hydraulic structure of a hydraulic device included in an electric brake according to an embodiment.

As shown in FIG. 13, the hydraulic device 300 includes a reservoir 310 in which a pressurized medium is stored, a master cylinder 320 that pressurises and discharges the pressurized medium such as brake oil accommodated inside while providing the reaction force according to the pedaling force of the brake pedal 50 to the driver, a hydraulic supply unit 330 that receives the driver's intention to brake as an electric signal by the pedal displacement sensor 51 that detects the displacement of the brake pedal 50 and generates the hydraulic pressure of the pressurized medium through mechanical operation, a hydraulic control unit 340 that controls the hydraulic pressure provided from the hydraulic supply unit 330, hydraulic circuits 350, 360 that include the wheel cylinders 31, 32, 33, 34 for braking the respective wheels 11, 12, 13, 14 through which the hydraulic pressure of the pressurized medium is transferred, a dump control unit 380 that is provided between the hydraulic supply unit 330 and the reservoir 310 to control the flow of the pressurized medium, backup passages 371 and 372 that hydraulic ally connect the master cylinder 320 and the hydraulic circuits 350, 360, reservoir passages 311, 312 that hydraulically connect the reservoir 310 and the master cylinder 320, and an inspection passage 390 hydraulic supply unit that is connected to the master chamber of the master cylinder 320.

When the driver applies pedaling force to the brake pedal 50 for braking operation, the master cylinder 320 provides reaction force to the driver to provide a stable pedal feeling and, at the same time, pressurizes and discharges the pressurized medium accommodated inside by the operation of the brake pedal 50.

The master cylinder 320 may include a cylinder body 321 that forms a chamber inside, a first master chamber 322*a* that is formed on the inlet side of the cylinder body 321 to which the brake pedal 50 is connected, a first master piston 322 that is provided in the master chamber 322*a* and connected to the brake pedal 50 to be displaceable by the operation of the brake pedal 50, a second master chamber 323*a* that is formed on the inner side or the front side (the left side with reference to FIG. 13) than the first master chamber 322*a* on the cylinder body 321, a second master piston 323 that is provided in the second master chamber 323*a* and is provided to be displaceable by the displacement of the first master piston 322 or the hydraulic pressure of the pressurized medium accommodated in the chamber 322*a*, and a pedal simulator 324 that is disposed between the first master piston 322 and the second master piston 323, and provides a feeling of pedaling through an elastic restoring force generated during compression.

The first master piston 322 and the second master piston 323 are respectively provided in the first master chamber 322a and the second master chamber 323a to form the hydraulic pressure or the negative pressure to the pressurized medium accommodated in each chamber according to the forward and backward movement.

The pedal simulator 324 is provided between the first master piston 322 and the second master piston 323, and may provide a pedal feel of the brake pedal 10 to the driver by its own elastic restoring force.

The reservoir 310 may accommodate and store the pressurized medium therein. The reservoir 310 may be connected to each component such as the master cylinder 320, the hydraulic supply unit 330, a hydraulic circuit to be described later, and the like to supply or receive the pressurized medium.

The reservoir passages 311, 312 include a first reservoir passage 311 that connects the first master chamber 322a of the master cylinder 320 and the reservoir 310 and a second reservoir passage 312 that connects the second master chamber 323a of the master cylinder 320 and the reservoir 310. A simulator valve 312a may be provided in the first reservoir passage 311 to control the flow of the pressurized medium between the reservoir 310 and the first master chamber 322a through the first reservoir passage 311.

The hydraulic supply unit 330 is provided to generate the hydraulic pressure of the pressurized medium through mechanical operation by receiving the driver's intention to brake as an electric signal from the pedal displacement sensor 51 that senses the displacement of the brake pedal 50.

The hydraulic supply unit 330 includes a cylinder block 331 that is configured to accommodate the pressurized medium, a hydraulic piston 332 that is accommodated in the cylinder block 331, pressure chambers 333, 334 that are partitioned by the hydraulic piston 332 and the cylinder block 331, a motor 336 that generates rotational force, a power conversion unit 337 that converts the rotational force of the motor 336 into translational movement of the hydraulic piston 332, and a drive shall 335 that transfers the power to hydraulic piston 332.

The pressure chambers 333, 334 may include a first pressure chamber 333 that is located in front of the hydraulic piston 332 (a left direction of the hydraulic piston 332 with reference to FIG. 13), and a second pressure chamber 334 that is located in a rear side of the hydraulic piston 332 (a right direction of the hydraulic piston 332 with reference to FIG. 13). That is, the first pressure chamber 333 is provided to be partitioned by the cylinder block 331 and the front surface of the hydraulic piston 332 so that the volume is changed according to the movement of the hydraulic piston 332, and the second pressure chamber 334 is provided to be partitioned by the cylinder block 331 and the rear surface of the hydraulic piston 332 so that the volume is changed according to the movement of the hydraulic piston 332.

When the displacement of the brake pedal 50 is sensed by the pedal displacement sensor 51, the hydraulic piston 332 may generate the hydraulic pressure in the first pressure chamber 333 while advancing in the cylinder block 331. Conversely, when the pedal force of the brake pedal 50 is released, the hydraulic piston 332 may generate the negative pressure in the first pressure chamber 333 while moving backward in the cylinder block 331. The generation of hydraulic pressure and negative pressure in the second pressure chamber 334 may be implemented by operating in the ways opposite the above.

As such, the hydraulic supply unit 330 may generate the hydraulic pressure or negative pressure in the first pressure chamber 333 and the second pressure chamber 334 respectively by the motor 336.

The hydraulic supply unit 330 may be hydraulically connected to the reservoir 310 by the dump control unit 380. The dump control unit 380 may include a plurality of passages and various solenoid valves to control the flow of the pressurized medium between the hydraulic pressure unit 330 and the reservoir 310.

The hydraulic control unit 340 may be provided to control the hydraulic pressure transmitted to each of the wheel cylinders 31, 32, 33, 34.

The hydraulic control unit 340 is branched to a first hydraulic circuit 350 that controls the flow of hydraulic pressure transmitted to the first and second wheel cylinders 31, 32 among the four wheel cylinders 31, 32, 33, 34, and a second hydraulic circuit 360 that controls the flow of hydraulic pressure transmitted to the third and fourth wheel cylinders 33, 34. The hydraulic control unit 340 includes a plurality of passages and valves to control the hydraulic pressure transmitted from the hydraulic pressure unit 330 to die wheel cylinders 31, 32, 33, 34.

The hydraulic control unit 340 regulates and controls the hydraulic pressure in the first pressure chamber 333 formed by the forward movement of the hydraulic piston 332 or the hydraulic pressure in the second pressure chamber 334 formed by the backward movement of the hydraulic piston 332, and provide them to the first hydraulic circuit 350 and the second hydraulic circuit 360. In addition, the hydraulic control unit 340 may recover the pressurized medium that has been provided to the first hydraulic circuit 350 and the second hydraulic circuit 360 through the negative pressure in the first pressure chamber 333 formed by the backward movement of the hydraulic piston 332 or the negative pressure in the second pressure chamber 334 formed by the forward movement of the hydraulic piston 332.

The first hydraulic circuit 350 may control the hydraulic pressure applied to the first and second wheel cylinders 31, 32, and the second hydraulic circuit 360 may control the hydraulic pressure applied to the third and fourth wheel cylinders 33, 34.

The first and second hydraulic circuits 350, 360 may respectively include first to fourth inlet valves 151a, 151b, 161a, 161b to control the flow of the pressurized medium and the hydraulic pressure transmitted to the first to fourth wheel cylinders 31, 32, 33, 34, The first to fourth inlet valves 151a. 151b, 161a, 161b are respectively disposed on the upstream side of the first to fourth wheel cylinders 31, 32, 33, 34 and are provided as normal open type solenoid valves.

The second hydraulic circuit 360 may include first and second outlet valves 362a, 362b that control the flow of the pressurized medium discharged from the third and fourth wheel cylinders 33, 34 to improve performance when the third and fourth wheel cylinders 33, 34 are released from braking. The first and second outlet valves 362a, 362b are provided on the discharge sides of the third and fourth wheel cylinders 33, 34, respectively, to control the flow of the pressurized medium transmitted from the third and fourth wheel cylinders 33, 34 to the reservoir 310. The first mid second outlet valves 362a, 362b may be provided as normal closed type solenoid valves.

The first and second wheel cylinders 31, 32 of the first hydraulic circuit 350 may be connected by branching a first backup passage 371, and at least one first cut valve 371a is provided in Cite first backup passage 371 to control the How of the pressurized medium between the first and second wheel cylinders 31, 32 and the master cylinder 320.

The electric brake system 10 may include the first and second backup passages 371, 372 so that the pressurized medium discharged from the master cylinder 320 is directly provided to the wheel cylinders 31, 32, 33, 34 for braking implementation when normal operation is impossible due to the failure and the like of the device. A mode in which the hydraulic pressure of the master cylinder 320 is directly transmitted to the wheel cylinders 31, 32, 33, 34 is referred as an abnormal operation mode, that is, a fallback mode.

The first backup passage 371 may be provided to connect the first master chamber 322a of the master cylinder 320 and the first hydraulic circuit 350, and the second backup passage 372 may be provided to connect the second master chamber 323a of the master cylinder 320 and the second hydraulic circuit 360.

At least one first cut valve 371a that controls the bidirectional flow of the pressurized medium may be provided in live first backup passage 371, and the second cut valve 372a that controls the bidirectional flow of the pressurized medium may be provided in the second backup passage 372. The first cut valve 371a and the second cut valve 372a may be provided as normal open type solenoid valves.

When the first and second cut valves 371a, 372a are closed, the pressurized medium of the master cylinder 320 is prevented from being directly transmitted to the wheel cylinders 31, 32, 33, 34, and at the same time, the hydraulic pressure provided from the hydraulic supply unit 330 is prevented from leaking toward the master cylinder 320. In addition, when the first and second cut valves 371a, 372a are opened, the pressurized medium pressurized by the master cylinder 320 may be directly provided to the first and second hydraulic circuits 350, 360 through the first and second backup passages 371, 372 for braking implementation.

The inspection passage 390 is provided to connect the master cylinder 320 and the dump control unit 380, and is provided to inspect whether various components mounted on the master cylinder 320 and the simulator valve 312a are leaking.

The hydraulic device 300 includes primary pressure sensors PS1a, PS2b that measure the hydraulic pressure of the second master chamber 323a and a secondary pressure sensor PS1b that measures the hydraulic pressure of the pressurized medium provided by the hydraulic supply unit 330. The first primary pressure sensor PS1a and the first secondary pressure sensor PS1b output the electric signal representing the measured pressure to the first controller 400, and the second primary pressure sensor PS2a and the second secondary pressure sensor PS2b may output the electric signal representing the measured pressure to the second controller 500.

FIG. 14 illustrates an electric configuration of a hydraulic device included in an electric brake system according to an embodiment.

As shown in FIG. 14, the electric brake system 10 includes a hydraulic device 300, a first controller 400, and a second controller 500.

The hydraulic device 300 may include the hydraulic circuit as shown in FIG. 13 described above. In addition, the hydraulic device 300 may include a solenoid valve 301 and a motor 336.

The solenoid valve 301 may be any one of the plurality of valves shown in FIG. 13. The solenoid valve 301 includes a valve coil 301a. When a current is supplied to the valve coil 301a, a magnetic field is generated inside and outside the valve coil 301a, and the opening and closing of the solenoid valve 301 can be switched. For example, the normal open type solenoid valve may be closed when the current is supplied to the valve coil 301a. Also, the normal closed type solenoid valve may be opened when the current is supplied to the valve coil 301a.

As shown in FIG. 14, the valve coil 301a of the solenoid valve 301 may be connected to both the first controller 400 and the second controller 500. In other words, the valve coil 301a may receive a driving current from the first controller 400 or a driving current from the second controller 500.

In the passage where the solenoid valve 301 is installed, a first pressure sensor (first primary pressure sensor, first secondary pressure sensor) PS1a, PS1b and a second pressure sensor (second primary pressure sensor, second secondary pressure sensor) PS2a, PS2b that measure the hydraulic pressure of passage or hydraulic circuit. The first pressure sensors PS1a, PS1b and the second pressure sensors PS2a, PS2b may be installed at the same or similar positions on the passage, and the first pressure sensors PS1a, PS1b and each of the second pressure sensors PS2a, PS2b can measure the hydraulic pressure in the passage. For example, the first pressure sensors PS1a, PS1b and the second pressure sensors PS2a, PS2b may be installed upstream of the inlet valves 351a, 351b, 361a, 361b, and each of the first pressure sensor PS1a, PS1b and the second pressure sensors PS2a, PS2b may measure the hydraulic pressure of the pressurized medium provided by the hydraulic supply unit 330.

The first pressure sensors PS1a, PS1b are electrically connected to the first controller 400, and may provide the electric signal representing the hydraulic pressure of the pressurized medium provided by the hydraulic supply unit 330 to the first controller 400. In addition, the second pressure sensors PS2a, PS2b are electrically connected to the second controller 500, and may provide the electric signal representing the hydraulic pressure of the pressurized medium provided by the hydraulic supply unit 330 to the second controller 500.

The motor 336 includes a first motor coil 336a and a second motor coil 336b. The motor 336 may include a stator fixed with respect to the housing of the electric brake system 10 and a rotor rotating with respect to the stator.

Both the first motor coil 336a and the second motor coil 336b may be provided in the stator of the motor 336, and a permanent magnet may be provided in the rotor. In other words, the motor 336 may be a dual winding motor. The stator of the motor 336 may include a plurality of teeth, and for example, both the first motor coil 336a and the second motor coil 336b may be wound or each of the plurality of teeth. As another example, the first motor coil 336a and the second motor coil 336b may be alternately wound around the plurality of teeth.

When the current (AC current) that is changed according to the rotation of the rotor is supplied to at least one of the first motor coil 336a and the second motor coil 336b, the stator may generate a magnetic field (AC magnetic field) that is changed according to the rotation of the rotor. The AC magnetic field of the stator magnetically interacts with the magnetic field generated by the permanent magnet of the rotor, and the rotor may rotate by the magnetic interaction.

As shown in FIG. 14, the first motor coil 336a is connected to the first controller 400, and the second motor coil 336b is connected to the second controller 500. For example, the first motor coil 336a may receive the AC current (driving current) from the first controller 400 and may generate the AC magnetic field. Also, the second motor coil 336b may receive the AC current (driving current) from the second controller 500 and may generate the AC magnetic field.

The motor 336 includes a first position sensor MPS1 and a second position sensor MPS2 that detect the rotation angle of the rotor. For example, each of the first position sensor MPS1 and the second position sensor MPS2 may include a Mall sensor, and the Hall sensor may senses a periodic change in a magnetic field chic to the rotation of the permanent magnet of a rotor.

The first position sensor MPS1 is electrically connected to the first controller 400, and may provide the electric signal representing a change in a magnetic field due to the rotation of die rotor of the motor 336 to the first controller 400. In addition, the second position sensor MPS2 is electrically connected to the second controller 500 and may provide the electric signal representing a change in the magnetic field due to the rotation of the rotor of the motor 336 to the second controller 500.

The first controller 400 may include a plurality of semi-conductor elements, and may be variously referred to as an Electric control Unit (ECU). The first controller 400 may include, for example, a plurality of processors and/or a plurality of memories.

The first controller 400 includes a first processor 410, a first motor driving circuit 420, a first valve driving circuit 430, and a first power circuit 440.

The first processor 410 may receive power from the first power circuit 440. The first processor 410 may output to the first motor driving circuit 420 and the first valve driving circuit 430 the control signal for controlling the motor 336 and the solenoid valve 301 based on output signals from the first pressure sensors PS1a, PS1b, the pedal displacement sensor 51 and the first position sensor MPS1.

The first processor 410 may include a CAN transceiver capable of communicating with other electric devices of the vehicle through the vehicle communication network.

The first processor 410 may include a memory that records/stores the program and data for braking the vehicle depending on the driver's intention to brake. In addition, the memory may provide the programs and data to the first processor 410, and record the temporary data generated during an arithmetic operation of the first processor 410. The memory may include a volatile memory such as a Static Random Access Memory (S-RAM), a Dynamic Random Access Memory (D-RAM) and the like, and a non-volatile memory such as a Read Only Memory (ROM), a Erasable Programmable Memory (EPROM), a flash memory and the like.

According to the program and data stored in the memory, the first processor 410 may provide the first motor driving circuit 420 and the first valve driving circuit with the control signal for controlling the motor 336 and the solenoid valve 301 based on the displacement signal of the pedal displacement sensor 51 and the pressure signal of the first pressure sensors PS1a, PS1b. For example, the first processor 301 may provide the first motor driving circuit 420 with the driving signal or driving the motor 336 to generate the hydraulic pressure. Specifically, the first processor 410 may provide the first motor driving circuit 420 with the driving signal for controlling the position of the hydraulic piston 332 of the hydraulic supply unit 330 based on the rotation angle of the rotor by the first, position sensor MPS1. Also, the first processor 301 may provide the first valve driving circuit with the open-close signal for opening and closing the solenoid valve 301 to guide the hydraulic pressure up to die wheel cylinders 31, 32, 33, 34.

According to the program and data stored in the memory, the first processor 410 may identify the hydraulic generation impossible state (a stale of failure or out of control) of the components (e.g., pressure sensor, pressure generation device, valves) included in the hydraulic device 300.

In response to identification of the hydraulic generation impossible state of the hydraulic device 300, the first processor 410 may provide the first parking brake 41 and the second parking brake 42 with the control signal for controlling the first parking brake 41 and the second parking brake 42 to brake the vehicle. In addition, if necessary, the first processor 410 may transmit the communication signal indicating the hydraulic generation impossible state of die hydraulic device 300 to the second controller 500.

The first processor 410 may include one semiconductor device or a plurality of semiconductors. Also, the first processor 410 may include one core or a plurality of cores within one semiconductor device. The first processor 410 may be referred variously, such as a micro controller unit (MCU).

The first motor driving circuit 420 may include an inverter circuit (e.g., H-Bridge) that receives a driving signal from the first processor 410 and provides the driving current to the first motor coil 336a of the motor 336 in response to the driving signal. For example, the inverter circuit may convert the DC power (DC current and DC voltage) of the first power circuit 440 into the AC power (AC current and AC voltage) according to the driving signal of the first processor 410 and may provide the AC current to the first motor coil 336a. The AC magnetic field is generated in the first motor coil 336a by the AC current, and the rotor of the motor 336 may rotate.

The first motor driving circuit 420 together with the second motor driving circuit 520 will be described in more detail below.

The first valve driving circuit 430 may include a switch circuit that receives an open/close signal from the first processor 410 and controls the current flowing through the valve coil 301a in response to the open/close signal. For example, the switch circuit may intermittently supply the DC current of the first power circuit 440 to the valve coil 301a according to the open/close signal of the first processor 410. By intermittently supplied DC current, the solenoid valve 301 may be partially opened or partially closed according to the open/close signal.

The first valve driving circuit 430 is described in more detail below along with the second valve driving circuit 530.

The first power circuit 440 may include a voltage circuit that receives power from the first battery BJ and converts the voltage of the received power into various voltages. The first power circuit 440 may distribute the power basing the converted voltage to each component of the first controller 400. For example, the first power circuit 440 may receive the power of 15V from the first battery B1, and provide the power of 15V to die first motor driving circuit 420 and the first valve driving circuit 430. Also, the first power circuit 440 may convert the power of 15V into the power of 5V and provide the power of 5V to the first processor 410.

The second controller 500 includes a second processor 510, a second motor driving circuit 520, a second valve driving circuit 530, and a second power circuit 540.

The second processor 510, the second motor driving circuit 520, the second valve driving circuit 530, and the second power circuit 540 may be the same as or similar to the first controller 400, the first motor driving circuit 420, first valve driving circuit 430, and die first power circuit. 440 of the first controller 400, respectively. For example, the second processor 510 is configured to provide the second motor driving circuit 520 and the second valve driving circuit with the control signal for controlling the motor 336 and the solenoid valve 301 based on the displacement signal of the pedal displacement sensor 51 and the pressure signal of the second pressure sensors PS2a, PS2b. The second motor driving circuit 520 may include an inverter circuit that provides the driving current to the second motor coil 336b of the motor 336 in response to the driving signal of the first processor 410. The first valve driving circuit 430 may include a switch circuit that controls the current flowing through the valve coil 301a in response to the open/close signal of the first processor 410. The second power circuit 540 may include a voltage circuit that receives power from the second battery B2 and converts the voltage of the received power into various voltages.

When the first controller 400 can operate normally, the first controller 400 controls the hydraulic device 300 and the first and second parking brakes 41, 42 and the second controller 500 may be deactivated or be in a standby state.

When the first controller 400 is in an inoperable state, the second controller 500 may control the hydraulic device 300 and the first and second parking brakes 41, 42. For example, in the inoperable state of the first controller 400 (e.g., power cut-off or failure, etc.), the first controller 400 may transmit to the second controller 500 the signal indicating the inoperable state of the first controller 400 through the vehicle communication network or a signal line. The second controller 500 may control the operation of the hydraulic device 300 in response to the signal indicating the inoperable state of the first controller 400.

The first controller 400 may check the operation state of the hydraulic device 300 and may identify whether the hydraulic device 300 is in the inoperable state. The first controller 400 may control the first parking brake 41 and the second parking brake 42 to generate the braking force of the vehicle in the inoperable state of the hydraulic device 300.

When both the first controller 400 and the hydraulic device 300 are in the inoperable state, the first controller 400 may transmit the signal indicating the inoperable state of the first controller 400 and the hydraulic device 300 to the second controller 500. The second controller 500 may control the operations of the first parking brake 41 and the second parking brake 42 in response to the signal indicating the inoperable state of the first controller 400 and the hydraulic device 300.

FIG. 15 illustrates a motor driving circuit included in an electric brake system according to an embodiment.

As shown in FIG. 15, the first moor driving circuit 420 may receive the DC power from the first power circuit 440 and receive the driving signal from the first processor 410. The first motor driving circuit 420 may convert the DC power of the first power circuit 440 into the AC power based on the driving signal of the first processor 410, and provide the converted AC power into the first power coil 336a of the motor 336.

The first motor driving circuit 420 includes an upper arm 421 and a lower arm 422. The upper arm 421 includes two switches 421a, 421b, and the lower arm 422 includes two switches 422a, 422b. Each of the switches 421a, 421b, 422a, 422b is controlled by the first processor 410, and is an Insulated Gate Bipolar Transistor (IGBT) or a Metal-Oxide-Silicon Field-Effect Transistor (MOSFET), but is not limited thereto, and may be any suitable semiconductor switch element.

The switches 421a, 421b, 422a, 422b are coupled by the H-Bridge, and may convert the DC power input from the first power circuit 440 into the AC power. The switches 421a, 421b of the upper arm 421 may be alternately turned on/off with the switches 422a, 422b of the lower arm 422 according to the driving signal of the first processor 410. In this case, the driving signal may be pulse-width-modulated to control the magnitude of the current supplied to the first motor coil 336a. While the switches 421a, 421b, 422a, 422b are alternately turned on/off by the pulse-width-modulated driving signal, the first motor coil 336a may be provided with the AC current whose direction and magnitude change with time.

For example, the first switch 421a of the upper arm 421 is turned on together with the second switch 422b of the lower arm 422, and the second switch 421b of the upper arm 421 and the first switch 422a of the lower arm 422 may be turned off while the first switch 421a of the upper arm 421 and the second switch 422b of the lower arm are turned on. As the first switch 421a of the upper arm 421 and the second switch 422b of the lower arm 422 are turned on, a positive current may be supplied to the first motor coil 336a.

In addition, the first switch 421a of the upper arm 421 is turned off together with the second switch 422b of tire lower arm 422, and the second switch 421a of the upper arm 421 and the first switch 422a of the lower arm 422 are turned on while the first switch 421b of the upper arm 421 and the second switch 422b of the upper arm 421 are turned off. As the first switch 421a of the upper arm 421 and the second switch 422b of the lower arm 422 are turned on, a negative current may be supplied to the first motor coil 336a.

Since the AC current is supplied to tire first motor coil 336a, the AC magnetic field whose direction and magnitude change with time may be generated in the first motor coil 336a. The rotor of the first motor 336 may rotate due to the magnetic interaction between the AC magnetic field of the first motor coil 336a and the magnetic field of the rotor.

The first processor 410 may identify the rotation angle of the rotor of the motor 336 based on the position signal of the first position sensor MPS1, and provide the switches 421a, 421b, 422a, 422b of the first motor driving circuit 420 with the driving signal for controlling the magnitude and direction of the AC magnetic field generated in the first motor driving circuit 420, based on the rotation angle of the rotor.

The second motor driving circuit 520 may receive the DC power from the second power circuit 540 and receive the pulse-width-modulated driving signal from the second processor 510. The second motor driving circuit 520 may convert the DC power of the second power circuit 540 into the AC power based on the pulse-width-modulated driving signal of the second processor 510 and provide the converted AC power into the second motor coil 336b of the motor 336.

The configuration of the second motor driving circuit 520 may be the same as that of the first motor driving circuit 420. The second motor driving circuit 520 includes an upper arm 521 and a lower arm 522, the upper arm 521 includes two switches 521a, 521b, and the lower arm 522 includes two switches 522a, 522b. The switches 521a, 521b, 522a, 522b are coupled by the H-Bridge, and may convert the DC power input from the first power circuit 440 into the AC power.

As such, the second motor driving circuit 520 may have the same configuration as that of the first motor driving circuit 420 and provide the same function. However, while the first motor driving circuit 420 supplies the AC current to the first motor coil 336a, the second motor driving circuit 520 may be deactivated. In other words, while the switches 421a, 421b, 422a, 422b included in the first motor driving circuit 420 are repeatedly turned on/off, the switches 521a, 521b, 522a, 522b included in the second motor driving circuit 520 may be turned off. Also, in the inoperable state of the first controller 400, the switches 521a, 521b of the upper arm 521 and the switches 522a, 522b of the lower arm 522 may be alternatively turned on/off according to the driving signal of the second processor 510.

FIG. 16 illustrates a valve driving circuit included in an electric brake system according to an embodiment.

As shown in FIG. 16, the first valve driving circuit 430 may receive the DC power from the first power circuit 440 and receive an open/close signal from the first processor 410. The first valve driving circuit 430 may control the current supplied from the first power circuit 440 to the valve coil 301a based on the open/close signal of the first processor 410.

The first valve driving circuit 430 includes a first switch 431 connected in series with the valve coil 301a. The first switch 431 is controlled by the first processor 410 and may be an insulated gate bipolar transistor or a field effect transistor.

The first switch 431 may control the current supplied from the first power circuit 440 to the valve coil 301a according to the open/close signal of the first processor 410. In this case, the open/close signal may be pulse-width-modulated to control the current supplied to the first motor coil 336a. According to the pulse-width-modulated open/close signal, the first switch 431 repeats the turned on/off, and the magnitude of the current supplied to the valve coil 301a may be controlled. As such, the solenoid valve 301 may be completely opened or closed according to the open/close signal of the first processor 410, but also may be partially opened or closed according to the pulse-width-modulated open/close signal of the first processor 410.

The second valve driving circuit 530 may receive the DC power from the second power circuit 540 and receive the open/close signal from the second processor 510. The second valve driving circuit 530 may control the current supplied from the second power circuit 540 to the valve coil 301a based on the open/close signal of the second processor 510.

The configuration of the second valve driving circuit 530 may be the same as that of the first valve driving circuit 430. The second valve driving circuit 530 includes the second switch 531 connected in series with the valve coil 301a.

As such, the second valve driving circuit 530 may have the same configuration as that of the first valve driving circuit 430 and provide the same function. However, while the first valve driving circuit 430 supplies the current to the valve coil 301a, the second valve driving circuit 530 may be deactivated. While the first switch 431 included in the first valve driving circuit 430 is repeatedly fumed on/off, the second switch 531 included in the second valve driving circuit 530 may be turned off. Also, in the inoperable state of the first controller 400, the second switch 531 may be turned on/off according to the open/close signal of the first processor 410.

The disclosed embodiments have been described with reference to the accompanying drawings as described above. Those of ordinary skill hi the art to which the present invention pertains will understand that the present invention may be practiced in other forms than the disclosed embodiments without changing the technical spirit or essential features of the present invention. The disclosed embodiments are illustrative and should not be construed as limiting.

The invention claimed is:

1. An electric brake system comprising:
a main device configured to provide a first hydraulic pressure to a plurality of wheel cylinders respectively installed on a plurality of wheels, based on a position of a brake pedal; and
an auxiliary device configured to provide a second hydraulic pressure to first and second wheel cylinders respectively installed on first and second wheels only among the plurality of wheels based on the position of the brake pedal in a state in which the main device does not generate the first hydraulic pressure,
wherein the auxiliary device is configured to receive power from a power network different from that of the main device, and the auxiliary device is configured to control first and second parking brakes respectively installed on third and fourth wheels, which cannot receive the second hydraulic pressure from the auxiliary device, among the plurality of wheels.

2. The electric brake system according to claim 1, wherein the auxiliary device engages or releases the first and second parking brakes respectively installed on the third and fourth wheels.

3. The electric brake system according to claim 1, wherein the main device engages or releases the first parking brake installed on the third wheel, and the auxiliary device engages or releases the second parking brake installed on the fourth wheel.

4. The electric brake system according to claim 1, wherein the main device engages or releases the first and second parking brakes respectively installed on the third and fourth wheels, and the auxiliary device engages or releases the first and second parking brakes respectively installed on the third and fourth wheels.

5. The electric brake system according to claim 4, wherein the main device transmits a message indicating engagement or release of the first and second parking brakes to the auxiliary device in response to engaging or releasing the first and second parking brakes, and the auxiliary device engages or releases the first and second parking brakes respectively installed on the third and fourth wheels in response to not receiving the message from the main device within a predetermined time.

6. The electric brake system according to claim 1, wherein the main device engages or releases the first parking brake and releases the second parking brake, and the auxiliary device engages or releases the second parking brake and releases the first parking brake.

7. The electric brake system according to claim 6, wherein the main device transmits a message indicating engagement or release of the first parking brake to the auxiliary device in response to engaging or releasing the first parking brake, and the auxiliary device releases the first parking brake in response to not receiving a message indicating release of the first parking brake from the main device within a predetermined time.

8. The electric brake system according to claim 6, wherein the auxiliary device transmits a message indicating engagement or release of the second parking brake to the main device in response to engaging or releasing the second parking brake, and the main device releases the second parking brake in response to not receiving a message indicating release of the second parking brake from the auxiliary device within a predetermined time.

9. A control method of an electric brake system comprising a main device that generates a first hydraulic pressure and an auxiliary device that generates a second hydraulic pressure by receiving power from a power network different from that of the main device, the control method comprising:

by the main device, providing the first hydraulic pressure to a plurality of wheel cylinders respectively installed on a plurality of wheels by the main device, based on a position of a brake pedal;

by the auxiliary device, providing the second hydraulic pressure to first and second wheel cylinders respectively installed on first and second wheels only among the plurality of wheels by the auxiliary device, based on the position of the brake pedal in a state in which the main device does not generate the first hydraulic pressure; and by the auxiliary device, controlling of first and second parking brakes respectively installed on third and fourth wheels, which cannot receive the second hydraulic pressure from the auxiliary device, among the plurality of wheels by the auxiliary device in response to a driver's parking command.

10. The control method of an electric brake system according to claim 9, wherein controlling at least one of the first and second parking brakes includes engaging or releasing the first and second parking brakes respectively installed on the third and fourth wheels by the auxiliary device in response to the driver's parking command.

11. The control method of an electric brake system according to claim 9, further comprising engaging or releasing the first parking brake installed on the third wheel by the main device, wherein controlling at least one of the first and second parking brakes includes engaging or releasing the second parking brake installed on the fourth wheel by the auxiliary device.

12. The control method of an electric brake system according to claim 9, further comprising engaging or releasing the first and second parking brakes respectively installed on the third and fourth wheels by the main device, wherein controlling at least one of the first and second parking brakes includes engaging or releasing the first and second parking brakes respectively installed on the third and fourth wheels by the auxiliary device.

13. The control method of an electric brake system according to claim 12, further comprising transmitting a message indicating engagement or release of the first and second parking brakes to the auxiliary device by the main device, wherein engaging or releasing of the first and second parking brakes includes engaging or releasing the first and second parking brakes respectively installed on the third and fourth wheels in response to not receiving the message from the main device within a predetermined time.

14. The control method of an electric brake system according to claim 9, further comprising engaging or releasing the first parking brake installed on the third wheel among the plurality of wheels and releasing the second parking brake installed on the fourth wheel among the plurality of wheels by the main device, wherein controlling the other one of the first parking brake and the second parking brake by the auxiliary device includes engaging or releasing the second parking brake installed on the fourth wheel among the plurality of wheels, and releasing the first parking brake installed on the third wheel among the plurality of wheels.

15. The control method of an electric brake system according to claim 9, wherein releasing the first parking brake by the auxiliary device includes transmitting a message indicating engagement or release of the first parking brake to the auxiliary device by the main device in response to engaging or releasing the first parking brake, and releasing the first parking brake by the auxiliary device in response to not receiving a message indicating the release of the first parking brake from the main device within a predetermined time, and releasing the second parking brake by the main device includes transmitting a message indicating engagement or release of the second parking brake to the auxiliary device by the auxiliary device in response to engaging or releasing the second parking brake, and releasing the second parking brake by the main device in response to not receiving a message indicating release of the second parking brake from the auxiliary device within a predetermined time.

* * * * *